United States Patent [19]
Reber et al.

[11] Patent Number: 5,986,651
[45] Date of Patent: Nov. 16, 1999

[54] METHOD, SYSTEM, AND ARTICLE OF MANUFACTURE FOR PRODUCING A NETWORK NAVIGATION DEVICE

[75] Inventors: William L. Reber, Schaumburg, Ill.; Cary D. Perttunen, Shelby Township, Mich.

[73] Assignee: Motorola, Inc., Schaumburg, Ill.

[21] Appl. No.: 08/744,338

[22] Filed: Nov. 7, 1996

[51] Int. Cl.⁶ ...................................................... G06F 3/00
[52] U.S. Cl. ......................................................... 345/335
[58] Field of Search ........................ 345/335; 395/200.3, 395/200.4, 680–684; 380/20–25; 235/380–382; 705/41

[56] References Cited

U.S. PATENT DOCUMENTS

| | | | |
|---|---|---|---|
| 4,841,132 | 6/1989 | Kajitani et al. | 235/472 |
| 5,156,898 | 10/1992 | McDonald | 428/100 |
| 5,590,197 | 12/1996 | Chen et al. | 380/24 |
| 5,640,193 | 6/1997 | Wellner | 348/7 |
| 5,671,279 | 9/1997 | Elgamal | 380/23 |
| 5,677,955 | 10/1997 | Doggett et al. | 380/24 |
| 5,699,528 | 12/1997 | Hogan | 705/40 |

OTHER PUBLICATIONS

"Business Card/32 4.1," InfoWorld, Mar. 31, 1997 p. 102.
"OnSite offering Helps Secure Transactions." Internet Week, Sep. 15, 1997, p. 21.
"Banking on the Future Marketing Financial Services on the Internet," Multimedia & Videodisc Monitor, May 1, 1996, V. 14, N. 5.
Article from the Internet: –Web TV, author Chris O'Malley, pp. 49–53.
From the Internet: –Discover the World Wide Web with Your Sportster, Second Edition, author Neil Randall.
From the Internet: –"Advertising" p. 1 of 1, and "The Anonymizer FAQ" pp. 1 to 5, Copyright 1995–1996, Community ConneXion, Inc.

*Primary Examiner*—A. Katbab
*Attorney, Agent, or Firm*—James E. Gauger

[57] ABSTRACT

A method of producing a network navigation device which includes writing machine-readable data (16) to a substrate (12), and writing a human-viewable image (14) to the substrate (12). The machine-readable data (16) provides an instruction for linking to a resource in an electronic network (20). The human-viewable image (14) is associated with the resource.

31 Claims, 12 Drawing Sheets

METHOD, SYSTEM, AND ARTICLE OF MANUFACTURE FOR PRODUCING A NETWORK NAVIGATION DEVICE

RELATED APPLICATIONS

The present application is a continuation-in-part of the following applications which are assigned to the same assignee as the present application:

"Electronic Network Navigation Device and Method for Linking to an Electronic Address Therewith", having Docket No. MNE00487 and Ser. No. 08/710,820, filed Sep. 23, 1996;

"Methods and Systems for Providing a Resource in an Electronic Network", having Docket No. MNE00490 and Ser. No. 08/726,004, filed Oct. 4, 1996; and "An Apparatus for Reading an Electronic Network Navigation Device and a Peripheral for Use Therewith", having Docket No. MNE00493 and Ser. No. 08/732,956, filed Oct. 17, 1996.

The subject matter of the above-identified related applications is hereby incorporated by reference into the disclosure of this application.

The present application is also related to:

"Method, System, and Article of Manufacture for Navigating to a Resource in an Electronic Network", having Ser. No. 08/890,138, filed Jul. 10, 1997, now U.S. Pat. No. 5,902,353; and "Method, System, and Article of Manufacture for Navigating to a Resource in an Electronic Network", having Ser. No. 08/890,140, filed Jul. 10, 1997, now U.S. Pat. No. 5,903,729

FIELD OF THE INVENTION

The present invention relates to devices for navigating to a resource in an electronic network.

BACKGROUND OF THE INVENTION

The introductory chapter of Discover the World Wide Web with Your Sportster, Second Edition, provides a commentary on the present state of the Internet and the World Wide Web. In this reference, it is stated that the Internet is in need of an application which will transform the "much-hyped but difficult-to-use linking of computers around the world to being a highly informative, highly usable database and communications tool." It is further stated that the various available Web browsers (e.g. Mosaic and Netscape Navigator) all have difficulties and limitations which make them insufficient to handle the complexity of the Internet.

Part of the problem is in the complexity of addressing a resource on the World Wide Web. The World Wide Web uses an addressing system known as a URL (Uniform Resource Locator) that defines the location of a resource on the Internet. URLs are comprised of up to four parts: a protocol, a domain name, a path, and a filename. The combination of these four parts can produce a complex address for a resource. For example, the address for information on two-way pagers on the Motorola home page is: http://www.mot.com/MIMS/MSPG/Products /Two-way/tango/desc.html.

Another part of the problem is in the rapid increase of the number of entities and the number of resources on the World Wide Web. Many entities are finding that domain names which they desire are already reserved. As a result, some entities have to purchase their desired domain name from another holder, or have to reserve a less than desirable domain name. Further, as the number of resources increases, newly-formed URLs become less intuitive and greater in length.

Resolving the problem of address complexity is important as various companies propose Internet navigation systems for the masses.

Accordingly, there is a need for an improved device for navigating in an electronic network.

BRIEF DESCRIPTION OF THE DRAWINGS

The invention is pointed out with particularity in the appended claims. However, other features of the invention may become more apparent and the invention may be best understood by referring to the following detailed description in conjunction with the accompanying drawings in which:

DETAILED DESCRIPTION OF THE PREFERRED EMBODIMENTS

Embodiments of the present invention advantageously provide methods and systems for producing a network navigation device for automatically linking a user to a resource in an electronic network. One such device includes a human-viewable image associated with the resource and machine-readable data for navigating to the resource. A user may access the resource by having machine-readable data read using a data reader rather than by typing an electronic address. As a result, the addressing format and the address itself become more transparent to the user. Consequently, the problem of address complexity and the criticality of reserving desired domain names is reduced.

Additionally, methods and systems are provided for an end user or for an automated service to produce network navigation devices. The methods can be advantageously utilized by the end user within a document browser software program, a word processor program, or a desktop publishing program, for example. The systems and the methods for producing the network navigation device are well-suited for utilization by the masses to navigate to desired sites on the Internet and the World Wide Web.

Figure 1:
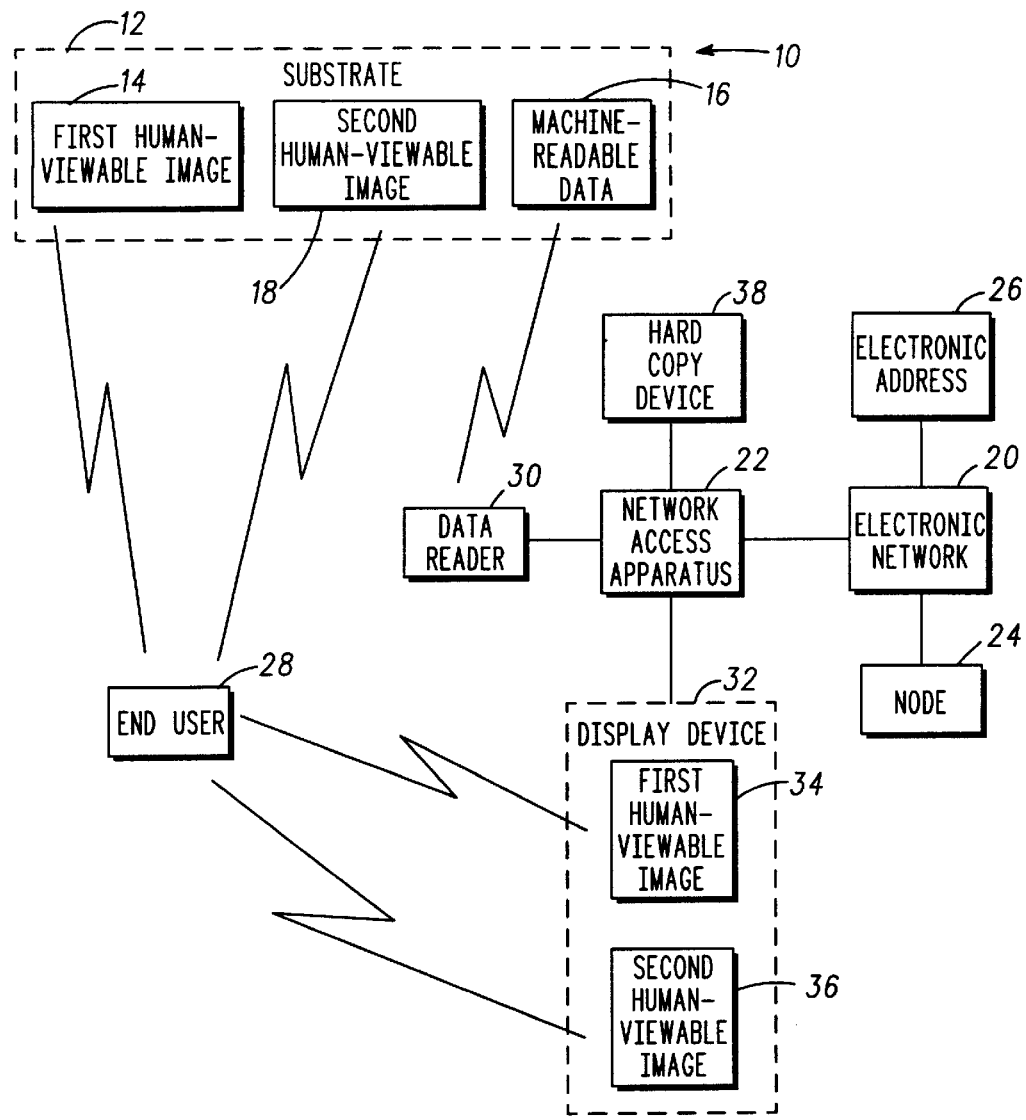
FIG. 1 is a block diagram of an embodiment of a network navigation device in accordance with the present invention.

FIG. 1 is a block diagram of a network navigation device 10 in accordance with a particular embodiment of the present invention. The network navigation device 10 comprises a substrate 12, a first human-viewable image 14 supported by the substrate 12, and machine-readable data 16 supported by the substrate 12. Optionally, the network navigation device further comprises a second human-viewable image 18 supported by the substrate 12.

The first human-viewable image 14 is preferably indicative of a resource in an electronic network 20. The second human-viewable image 18 may preferably indicate any combination of: a client routine (e.g. an Internet or intranet browser routine) which is utilized to display the resource, a service provider (e.g. an Internet service provider) which connects a network access apparatus 22 to the electronic network 20, a service which provides the resource to a network access apparatus 22 via the electronic network 20, or an advertiser.

Optionally, a node 24 in the electronic network 20 is used to provide the resource to an end user 28. Here, the resource can be locally present at the node 24 or can be at another electronic address 26 in the electronic network 20. Further, the node 24 can include a mirror server to provide resources found elsewhere on the electronic network 20.

Although embodiments of the present invention can be advantageously utilized for any electronic network having an electronic addressing scheme for identifying servers and information contained therein, of particular interest are embodiments of the present invention where the electronic network 20 includes the Internet, the World Wide Web, or an intranet. In this case, the machine-readable data 16 can include an electronic address to identify the resource, such as at least a portion of a URL or an IP (Internet Protocol) address. Alternatively, the machine-readable data 16 can include a code from which the node 24 identifies the resource.

It is noted that a URL can includes up to four parts: a protocol, a domain name, a path, and a filename. URL protocols include: "file:" for accessing a file stored on a local storage medium; "ftp:" for accessing a file from an FTP (file transfer protocol) server; "http:" for accessing an HTML (hypertext marking language) document; "gopher:" for accessing a Gopher server; "mailto:" for sending an e-mail message; "news:" for linking to a Usenet newsgroup; "telnet": for opening a telnet session; and "wais:" for accessing a WAIS server. Consequently, network navigation devices in accordance with the present invention can be utilized for initiating any of the above tasks.

The first human-viewable image 14 can include textual information and/or graphical information which preferably provides an intuitive and/or understandable representation of the resource. As an example, to provide a network navigation device for the Motorola Web page on two-way pagers, the human-viewable image 14 can include textual information such as "Motorola" and/or "Two-Way Pagers", graphical information such as an image or an illustration of a Motorola two-way pager, or a combination of textual information and graphical information. Such a human-viewable image is more intuitive and more understandable to the end user 28 than an electronic address having the form of http://www.mot.com/MIMS/MSPG/ Products/Two-way/ tango/desc.html.

The second human-viewable image 18 can include textual information and/or graphical information, such as information which indicates to the end user 28 a service (e.g. a node service, a service provider, a client routine, and/or an advertiser) which is providing the resource. For example, the second human-viewable image 18 can include textual information such as "Brought to you by" and the name of the service, graphical information such as a logo for the service, or a combination of textual information and graphical information.

The machine-readable data 16 is communicated to the network access apparatus 22 by a data reader 30. The form of the data reader 30 is dependent upon the form of the machine-readable data 16. For printed data, the data reader 30 can include an optical imaging reader such as a scanning wand, a linear CCD (charge coupled device) reader, or a two-dimensional CCD reader. For magnetically-stored data the data reader 30 can include a magnetic read head, such as those within a magnetic stripe reader. For electronically-stored data, the data reader 30 can include a suitable electronic interface or a receiver.

If desired, the machine-readable data 16 can be selected to be readable by more than one type of data reader. For example, printed data can be printed with a magnetic substance, such as magnetic ink, so as to be readable by both an optical reader and a magnetic reader.

Generally, the machine-readable data 16 can include instructions which direct the network access apparatus 22 to execute any combination of: a predetermined client routine (e.g. a predetermined Internet browser routine), a predetermined network provider access routine (e.g. dialing and logging on to a predetermined service provider), and navigation instructions for automatically linking the network access apparatus 22 to the electronic address 26 via the electronic network 20.

The network access apparatus 22 can have a variety of forms, including but not limited to, a general purpose computer, a network computer, a network television, an internet television, a portable wireless device, a television receiver, a game player, a video recorder, and an audio component. A display device 32, such as a monitor or a television, is coupled to the network access apparatus 22 to display visual content of the resource upon linking to the electronic address 20. To reinforce the association between the network navigation device 10 and the resource, a first image 34 viewable on the display device 32 upon linking to the resource may be similar to (or can be equivalent to) at least a portion of the first human-viewable image 14. To reinforce the association between the network navigation device 10 and the service which provides the resource, a second image 36 viewable on the display device 32 may be similar to (or can be equivalent to) at least a portion of the second human-viewable image 18.

The network access apparatus 22 can communicate with a hard copy device 38 to provide a hard copy representation of an experience provided by the network navigation device 10. The hard copy device 38 can have a variety of forms, including but not limited to, a printer, a laser printer, an ink jet printer, a thermal printer, a plotter, and a fax machine.

The hard copy representation allows the end user 28 to retrace an experience or navigation session initiated by the network navigation device 10. The hard copy representation can include at least a portion of the content from one or more resources of the electronic network 20 accessed during the experience. For example, the hard copy representation can include a plurality of images in a gallery form which summarize the experience. Alternatively, or in addition thereto, the hard copy representation can include a map which summarizes the electronic addresses visited during the experience.

If desired, the hard copy device 38 can print the hard copy representation onto the substrate 12, or onto another substrate which can be attached to the substrate 12. As a result, a souvenir of the navigation session is physically linked to the network navigation device 10 which initiated the navigation session.

Figure 2:
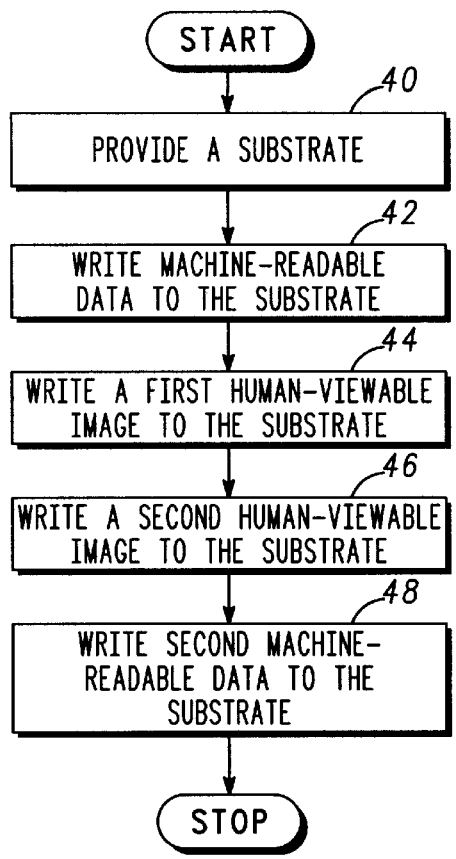
FIG. 2 is a flow chart of an embodiment of a method of producing a network navigation device in accordance with the present invention.

FIG. 2 is a flow chart of an embodiment of a method of producing a network navigation device in accordance with the present invention. As indicated by block 40, the method includes a step of providing a substrate, such as the substrate 12 in FIG. 1.

Preferably, the substrate 12 is formed by a substantially flat piece of material. Examples of materials which can be utilized to form the substrate 12 include, but are not limited to, dielectric materials such as paper, cardboard, and plastic, and substantially nonmagnetic materials. If desired, the material and its thickness can be selected so that the substrate 12 is stiff, yet flexible. It is noted that, in general, the substrate 12 need not be homogeneous, i.e. more than two materials can be utilized to form the substrate 12.

It is also preferred that the substrate 12 be shaped and sized to facilitate ease in handling by individuals, such as the end user 28. For this purpose, the substrate 12 can be card-shaped. Here, for example, the substrate 12 can have the size of a business card, a credit card, an index card, a trading card (e.g. a baseball card), or a playing card (e.g. from a deck of playing cards).

In other embodiments, the substrate 12 is shaped and sized as a sheet or a page. Here, the substrate 12 can comprise a standard-sized or a custom-sized sheet of printing material. Examples include, but are not limited to, letter-sized paper, legal-sized paper, A4-sized paper, and 11×17 inch paper. The substrate 12 can include a page in a book, a magazine, a newspaper, or other printed publication.

It is noted that the substrate 12 can be folded or attached to a page which is folded. As a result, the network navigation device 10 can assume two profiles: (i) an unfolded profile which provides surface areas for supporting all of the machine-readable data 16, the human-viewable images 14 and 18, and additional information; and (ii) a smaller, folded profile which provides smaller externally-accessible surfaces for supporting a subset of the above-described information.

It is noted that embodiments of the present invention are not limited to the above-described shapes and sizes of the substrate 12. In general, the substrate 12 can have various shapes, such as rectangular, circular, oval, or polygonal shapes, and can have various sizes.

As indicated by block 42, the method includes a step of writing machine-readable data to the substrate. The machine-readable data, such as the machine-readable data 16 shown in FIG. 1, provides an instruction for linking to a resource in an electronic network. The machine-readable data 16 can include any combination of: an instruction for directing a connection to a service provider to access the electronic network, a navigation instruction for linking to the resource, and an instruction for selecting a client routine to display the content of the resource.

The step of writing the machine-readable data 16 to the substrate 12 can be performed in a variety of ways. In some embodiments, the step of writing the machine-readable data includes printing the machine-readable data 16. The machine-readable data 16 can be printed directly onto the substrate 12, printed onto a second substrate for affixing or adhering to a surface of the substrate 12, or can be printed to a member contained within the substrate 12. In these embodiments, the machine-readable data 16 can include a bar code, such as a one-dimensional or a two-dimensional bar code, representative of the navigation instructions. Examples of one-dimensional bar codes include, but are not limited to, 3 of 9, UPC-A, Code 128, Codabar, MSI, Extended 3 of 9, Code 93, Extended Code 93, Industrial 2 of 5, Standard 2 of 5, Code 11, and UCC/EAN-128. Examples of two-dimensional bar codes include, but are not limited to, Data Matrix and PDF417.

Typically, the printed form of the machine-readable data 16 is not readily interpretable or not readily discernible by the end user 28. For example, although a human may be specially trained to mentally decode a bar code, such a code is practically indiscernible by most humans. Further, the machine-readable data 16 can be printed to be either visible or invisible to the end user 28.

In other embodiments, the step of writing the machine-readable data 16 includes writing the machine-readable data 16 to a magnetic storage medium. This step can be performed by: (i) magnetically writing the machine-readable data 16 to a portion of the substrate 12 having a magnetic storage medium; (ii) magnetically writing the machine-readable data 16 to a magnetic storage medium for affixing to the substrate 12; or (iii) magnetically writing the machine-readable data to a magnetic storage medium contained (e.g. sandwiched) within the substrate 12. Here, the machine-readable data 16 can be written to the magnetic storage medium using a magnetic write head or the like.

In further embodiments, the step of writing the machine-readable data 16 includes writing the machine-readable data 16 to a memory supported by the substrate 12. The machine-readable data 16 is communicated to the memory either via an interface integrated with the network navigation device, or via a receiver integrated with the network navigation device.

As indicated by block 44, the method further includes a step of writing the first human-viewable image 14 to the substrate. The first human-viewable image 14 is associated with and preferably indicative of the resource.

The first human-viewable image 14 can be written to the substrate 12 in a variety of ways. In one embodiment, the first human-viewable images 14 is printed directly onto the substrate 12. In another embodiment, the first human-viewable images 14 is printed onto a second substrate for affixing or adhering to a surface of the substrate 12. Here, for example, the second substrate can have an adhesive backing for affixing the first human-viewable image 14 to the substrate 12. As another alternative, the first human-viewable image 14 can be printed to a member which is contained (e.g. sandwiched) within the substrate 12.

As indicated by block 46, the method optionally includes the step of writing a second human-viewable image to the substrate. The second human-viewable image can be associated with a service provider used to access the electronic network, a client routine used to display the content of the resource, a node used to link to the resource, and/or an advertiser.

As indicated by block 48, the method optionally includes a step of writing second machine-readable data to the substrate. The second machine-readable data provides an instruction for linking to a second resource associated with the second human-viewable image.

FIGS. 3 to 9 illustrate various examples of embodiments of the network navigation device 10 produced using embodiments of the method described with reference to FIG. 2. It is noted that the teachings herein can be interchanged and combined among the various examples to form additional embodiments.

Figure 3:
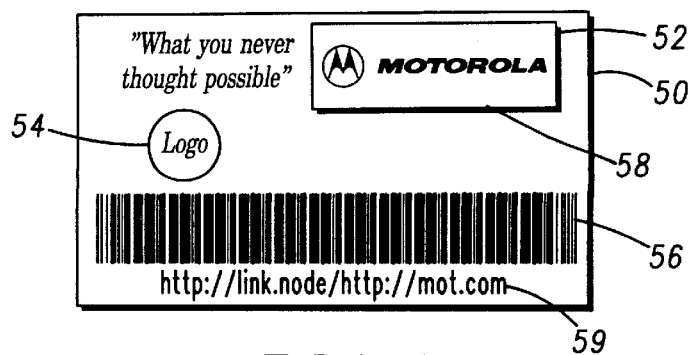
FIG. 3 is an illustration of a first network navigation device generated in accordance with an embodiment of the present invention.

FIG. 3 is an illustration of a first network navigation device generated in accordance with an embodiment of the present invention. The network navigation device includes a substrate 50 which supports a first human-viewable image 52, a second human-viewable image 54, and machine-readable data 56.

The first human-viewable image 52 includes information which indicates to an end user that the network navigation device can be utilized to link to a resource from or about Motorola, Inc. For this purpose, included in the human-viewable image 52 is textual information such as "Motorola", the "What you never thought possible" trademark, and graphical information such as the Motorola logo 58.

The second human-viewable image 54 includes a logo which identifies a service which provides the resource to the end user. In this embodiment, the logo identifies a linking service provided at a node (such as the node 24 in FIG. 1) on the World Wide Web.

The machine-readable data 56 includes a bar code representation of a first URL for the node which provides the linking service (in particular, http://link.node/), and a second URL for the Motorola home page on the World Wide Web (in particular, http://mot.com). It is noted that the URL of http://link.node/ is a fictitious URL, and is utilized for purposes of illustration only. If desired, a printed, human-viewable representation 59 of any of the machine-readable data 56 can be supported by the substrate 50.

The first URL provides a navigation instruction for automatically linking the network access apparatus 22 to the node 24 via the electronic network 20. The second URL is utilized to link the node 24 to the Motorola home page (for example, at the electronic address 26) via the electronic network 20. The node 24 receives content from the Motorola home page upon linking thereto. The content is transferred from the node 24 to the network access apparatus 22 via the electronic network 20.

Optionally, the content delivered to the network access apparatus 22 can be modified at the node 24 to include an image corresponding to at least a portion of the second human-viewable image 54. Here, for example, the content can be modified to include an image of the logo for the linking service.

In the embodiment illustrated in FIG. 3, the substrate 50 has the size of a business card (3.5 inches by 2 inches). Preferably, the substrate 50 is formed entirely of a dielectric and/or nonmagnetic material such as paper, cardboard, or plastic. These materials are advantageous for producing a network navigation device which is inexpensive, and hence, can be disposed after use.

The human-viewable images 52 and 54 and the machine-readable data 56 can be printed directly onto the substrate 50. Alternatively, the human-viewable images 52 and 54 and the machine-readable data 56 can be printed onto a second substrate, which is thereafter affixed to the substrate 50.

Figure 4:
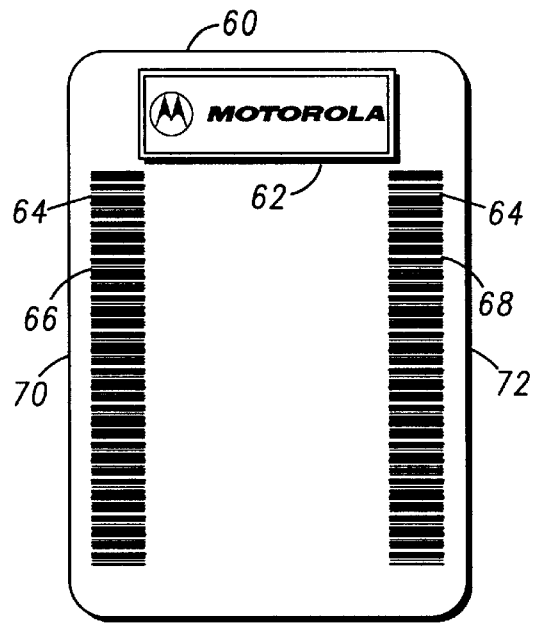
FIG. 4 is an illustration of a second network navigation device generated in accordance with an embodiment of the present invention.

FIG. 4 is an illustration of a second network navigation device generated in accordance with an embodiment of the present invention. The second network navigation device includes a substrate 60 which supports a human-viewable image 62 to indicate to an end user that the network navigation device can be utilized to link to a resource from or about Motorola, Inc. The substrate 60 further supports machine-readable data 64 in the form of a first bar code representation 66 and a second bar code representation 68 of a URL for the Motorola home page (in particular, http://mot.com).

The first bar code representation 66 and the second bar code representation 68 are disposed on different halves of the substrate 60. Preferably, the first bar code representation 66 is aligned with and located proximate to a first edge 70 of the substrate 60, while the second bar code representation 68 is aligned with and located proximate to a second edge 72 of the substrate 60.

As a result, the end user can grasp the network navigation device from either of two sides without obstructing at least one of the first bar code representation 66 and the second bar code representation 68. Further, by disposing the human-viewable image 62 in a natural viewing orientation on the substrate 60, the end user can view an indication of the resource while grasping the network navigation device from either of the two sides. Hence, this embodiment of the network navigation device is amenable for both right-handed and left-handed use by the end user.

In the embodiment illustrated in FIG. 4, the substrate 60 has the size of a playing card (2.5 inches by 3.5 inches). The substrate 60 is preferably formed of a dielectric material and/or a nonmagnetic material such as paper, cardboard, or plastic.

Figure 5:
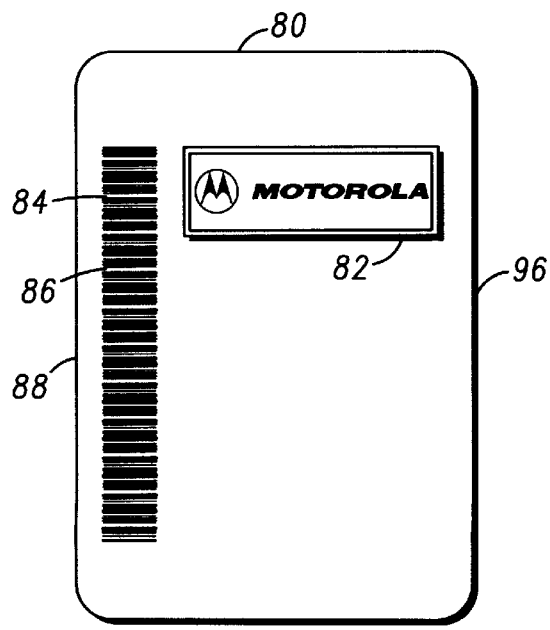
FIG. 5 is an illustration of one surface of a third network navigation device generated in accordance with an embodiment of the present invention.

FIG. 5 is an illustration of one surface of a third embodiment of a network navigation device generated in accordance with an embodiment the present invention. The third network navigation device includes a substrate 80 which supports a human-viewable image 82 indicating that the third network navigation device can be utilized to link to a resource from or about Motorola, Inc. The substrate 80 further supports machine-readable data 84 in the form of a first bar code representation 86 of a URL for the Motorola home page (in particular, http://mot.com). The first bar code representation 86 is aligned with and located proximate to an edge 88 of the substrate 80.

Figure 6:
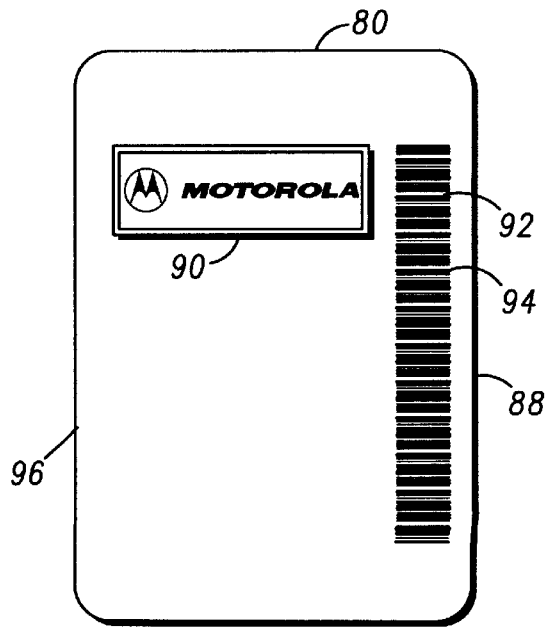
FIG. 6 is an illustration of an opposing surface of the third network navigation device.

FIG. 6 is an illustration of an opposing surface of the third network navigation device. At the opposing surface, the substrate 80 supports a human-viewable image 90 which, preferably, is the same as the human-viewable image 82. The substrate 80 further supports machine-readable data 92 in the form of a second bar code representation 94 of the URL for the Motorola home page. Preferably, the first bar code representation 86 and the second bar code representation 94 are identical. The second bar code representation 94 is aligned with and located proximate to the edge 88 of the substrate 80.

As a result, the end user can grasp the network navigation device of FIGS. 5 and 6 from a side 96 without obstructing at least one of the first bar code representation 86 and the second bar code representation 94. Hence, the third network navigation device is amenable for both right-handed use, using one surface, and left-handed use, using the opposing surface.

In the embodiment illustrated in FIGS. 5 and 6, the substrate 80 has the size of a playing card (2.5 inches by 3.5 inches). The substrate 80 is preferably formed of a dielectric material and/or a nonmagnetic material such as paper, cardboard, or plastic.

The use of a printed image and printed data on a paper, cardboard or plastic substrate, such as in FIGS. 3 to 6, provides a number of advantages. A first advantage is that the resulting network navigation device can be produced inexpensively for wide distribution. For example, these network navigation devices can be: (i) included as inserts in magazines, newspapers, or other publications; (ii) stacked into decks and packaged for distribution by mail or for marketing in stores; and/or (iii) distributed as one distributes business cards. A second advantage is that a user can rapidly thumb through a number of network navigation devices to find network resources of interest by viewing the image on each network navigation device. In addition, the network navigation devices can be collected and traded in a manner similar to trading cards.

In addition, the use of a printed image and printed data allows for network navigation devices to be formed on pages of a book, magazine, newspaper, or other publication. In general, each page can define a single network navigation device, or can define a plurality of network navigation devices. If desired, a page defining a plurality of network navigation devices can be perforated to allow for separation into individual network navigation devices.

In one application, the printed image can include a figure in a book or the like. Here, the printed data may be utilized to link a user to a resource having information associated with the figure. If desired, the printed data can be included in a caption for the figure. In another application, a plurality of pages of network navigation devices are assembled to form a directory of resources in an electronic network.

Further, the use of a printed image and printed data allows for network navigation devices to be formed on packages, boxes, containers, and the like. Here, for example, a network navigation can be formed on a surface of a cereal box.

Although the embodiments of FIGS. 3 to 6 illustrate a single printed code on the network navigation device, it is noted that separate printed codes can be utilized for each of the various types of information stored on a network navigation device.

Figure 7:
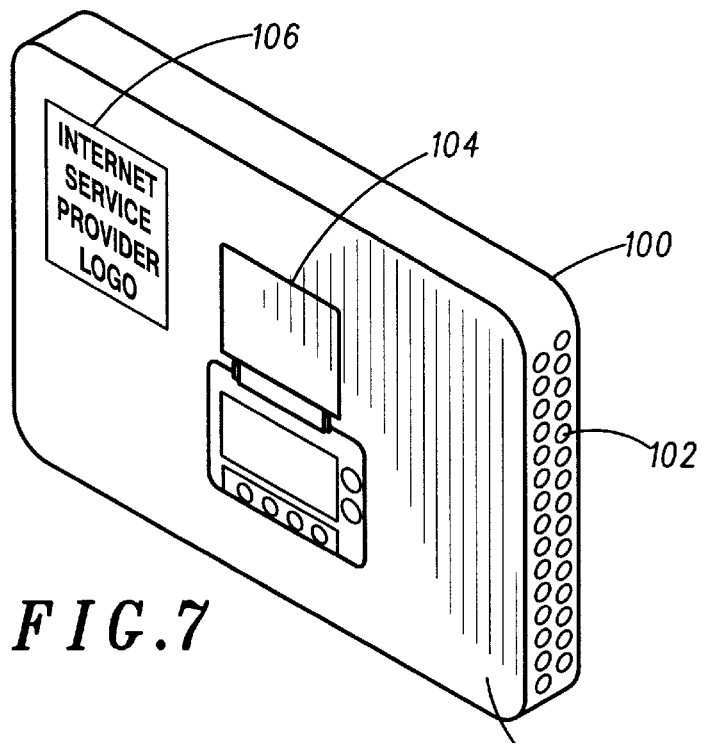
FIG. 7 illustrates a fourth network navigation device generated in accordance with an embodiment of the present invention.

FIG. 7 illustrates a fourth network navigation device generated in accordance with an embodiment of the present invention. The fourth network navigation device includes a PCMCIA memory card 100 having stored therein machine-readable data representative of navigation instructions for linking to a resource. The PCMCIA memory card 100 has a PCMCIA interface 102 for communicating the machine-readable data to a data reader with a mating PCMCIA interface.

The PCMCIA memory card 100 supports a first externally-viewable image 104 and a second externally-viewable image 106 at an exterior surface 108. Hence, the substrate as described earlier includes a portion of the housing of the PCMCIA memory card 100.

In this example, the first externally-viewable image 104 includes an image of a two-way pager available from Motorola. The second externally-viewable image 106 includes a logo of a service provider, such as an internet service provider, through which access to the electronic network 20 is provided.

The machine-readable data includes instructions for connecting to the internet service provider. The instructions for connecting can include, for example, a telecommunication number (such as a phone number) which is to be dialed to access the internet service provider. The machine-readable data can further include a code, such as a password, for authentication by the internet service provider. Based upon the code, access to the resource is either allowed, limited, or inhibited. Further, the code can be utilized by the internet service provider to uniquely identify the network navigation device.

In addition, the machine-readable data includes a representation of the URL for information on the two-way pager on the World Wide Web, which is http://www.mot.com/MIMS/MSPG/Products/Two-way/tango/. The internet service provider utilizes the URL to link the end user 28 to the resource to receive information on the two-way pager.

Figure 8:
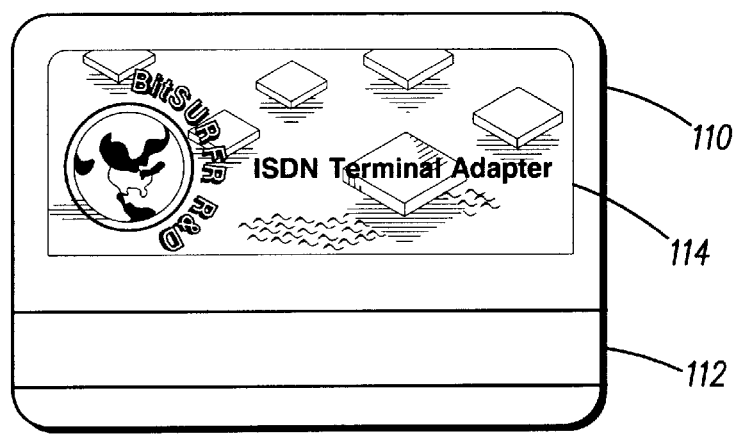
FIG. 8 illustrates a fifth network navigation device generated in accordance with an embodiment of the present invention.

FIG. 8 illustrates a fifth network navigation device generated in accordance with an embodiment of the present invention. The network navigation device includes a substrate 110 which supports a magnetic storage medium 112. In the example of FIG. 8, the magnetic storage medium 112 has the form of a magnetic stripe, although alternative forms can be utilized. The magnetic storage medium 112 stores machine-readable data providing navigation instructions for linking to a resource. The machine-readable data is communicated to a data reader having a magnetic reading head, such as a magnetic stripe reader.

The substrate 110 supports a human-viewable image 114 indicative of a resource, such as a resource for a Motorola modem. Accordingly, the magnetic storage medium 112 can store a representation of the URL for obtaining information on the Motorola modem, which is http://www.mot.com/MIMS/ISG/Products/bitsurfr_pro/.

In the embodiment illustrated in FIG. 8, the substrate 110 has the size of a credit card (3.375 inches by 2.25 inches). Preferably, the substrate 110 is formed of a dielectric and/or nonmagnetic material such as paper, cardboard, or plastic. Here, magnetic material in the network navigation device is within the magnetic storage medium 112.

Figure 9:
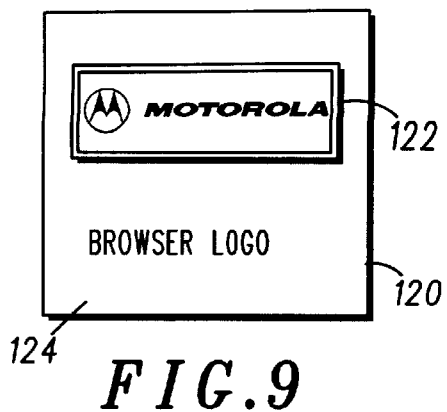
FIG. 9 illustrates a sixth network navigation device generated in accordance with an embodiment of the present invention.

FIG. 9 illustrates a sixth network navigation device generated in accordance with an embodiment of the present invention. The sixth network navigation device includes a radio frequency tag 120 containing navigation instructions for accessing a resource. The radio frequency tag 120 includes a memory containing data representative of the navigation instructions, and a transmitter which transmits a signal representative of the data for external reception. The memory can be either read-only or read-write. In general, the radio frequency tag 120 can be either active (i.e. having an internal battery for powering its circuits) or passive (i.e. powering its circuits using externally-generated power).

Various commercially-available radio frequency tags can be utilized for the radio frequency tag 120, including but not limited to, tags produced by Indala Corporation and the MicroStamp RIC (Remote Intelligent Communication) tags available from Micron Communications, Inc. Illustrated in FIG. 9 is a network navigation device based on the MicroStamp RIC unit, which is postage-stamp sized (1.25 inches by 1.25 inches).

A human-viewable image 122 is supported by an exterior surface of the radio frequency tag 120. Hence, the substrate as described earlier includes a portion of the housing of the radio frequency tag 120. In this example, the human-viewable image 122 includes the Motorola logo, which indicates that the navigation instructions will link a user to a resource which provides information related to Motorola, Inc.

In this embodiment, the machine-readable data includes an electronic address for linking to a node (such as the node 24 in FIG. 1), and a code which identifies the resource to the node. The code is utilized so that the electronic address for the resource is concealed from end users. The node converts the code to an electronic address for the resource, links to the electronic address, and communicates content of the resource to the end user 28.

The machine-readable data further includes an instruction which initiates the execution of a predetermined Web browser for displaying the content of the resource. A logo for the predetermined Web browser is included in a second human-viewable image 124 supported by the exterior surface of the radio frequency tag 120.

Figure 10:
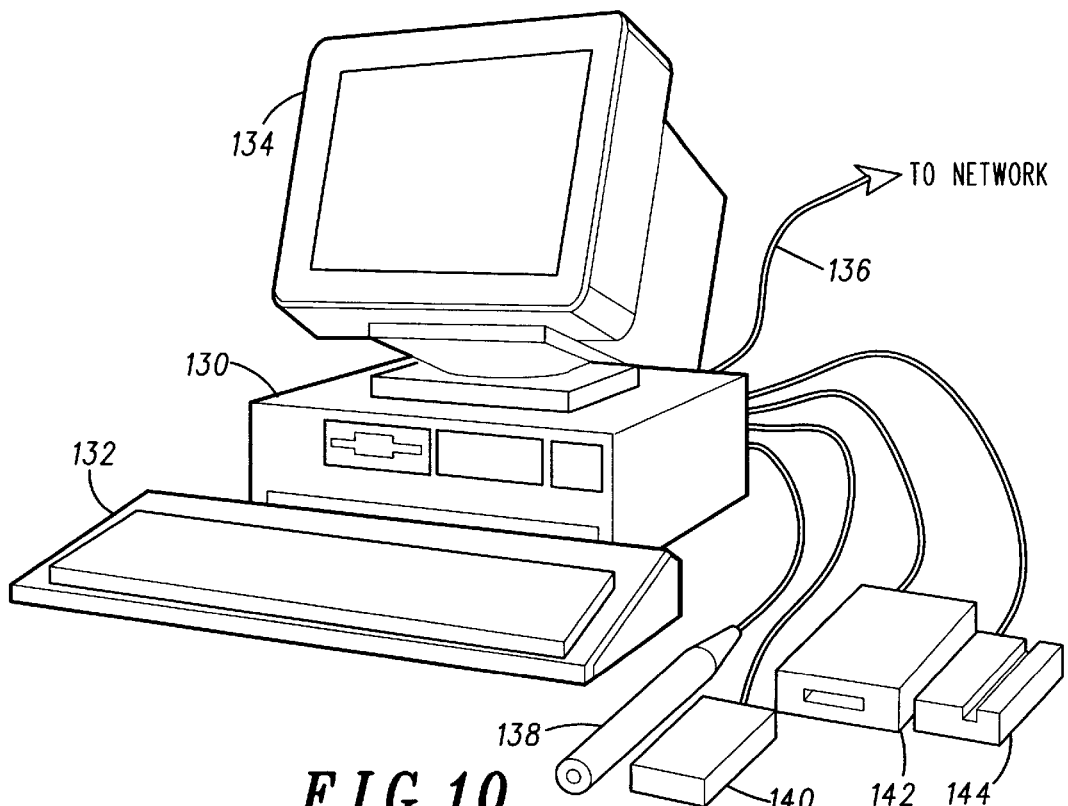
FIG. 10 is a general diagram that illustrates an example of a network access apparatus and examples of various data readers for reading machine-readable data from a network navigation device.

FIG. 10 illustrates an example of a network access apparatus and examples of various data readers for reading machine-readable data from a network navigation device. In this example, the network access apparatus includes a personal computer 130 having an input interface, such as a keyboard 132, and a display device, such as a monitor 134, coupled thereto.

The personal computer 130 communicates with an electronic network via a line 136, which can include a telephone line, an ISDN line, a coaxial line, a cable television line, a fiber optic line, a computer network line, or the like. Alternatively, the personal computer 130 can wirelessly communicate with the electronic network. Based on the mode of communication with the electronic network, the personal computer 130 can include a modem and/or a transceiver to communicate with the electronic network. The electronic network can be provided by an online service, an Internet service provider, a local area network service, a wide area network service, a cable television service, a wireless data service, an intranet, or the like.

The various data readers coupled to the personal computer 130 include a bar code reader 138, an RF tag reader 140, a PCMCIA card reader 142, and a magnetic stripe reader 144. The bar code reader 138 is utilized to read bar-coded navigation instructions from a network navigation device, such as those illustrated in FIGS. 3 to 6. The RF tag reader 140 is utilized to receive and decode an electromagnetic signal representative of the navigation instructions generated by an RF tag, such as one illustrated in FIG. 9. The PCMCIA card reader 142 interfaces with a PCMCIA card, such as one illustrated in FIG. 7, to read navigation instructions stored therein. The magnetic stripe reader 144 reads magnetically-stored navigation instructions stored by a magnetic stripe, such as one illustrated in FIG. 8.

It is noted that the bar code reader 138 is illustrative of any optical reading device which can be utilized. Similarly, the PCMCIA card reader 142 is illustrative of any memory card reader which can be utilized, and the magnetic stripe reader 144 is illustrative of any magnetic reading device which can be utilized.

Figure 11:
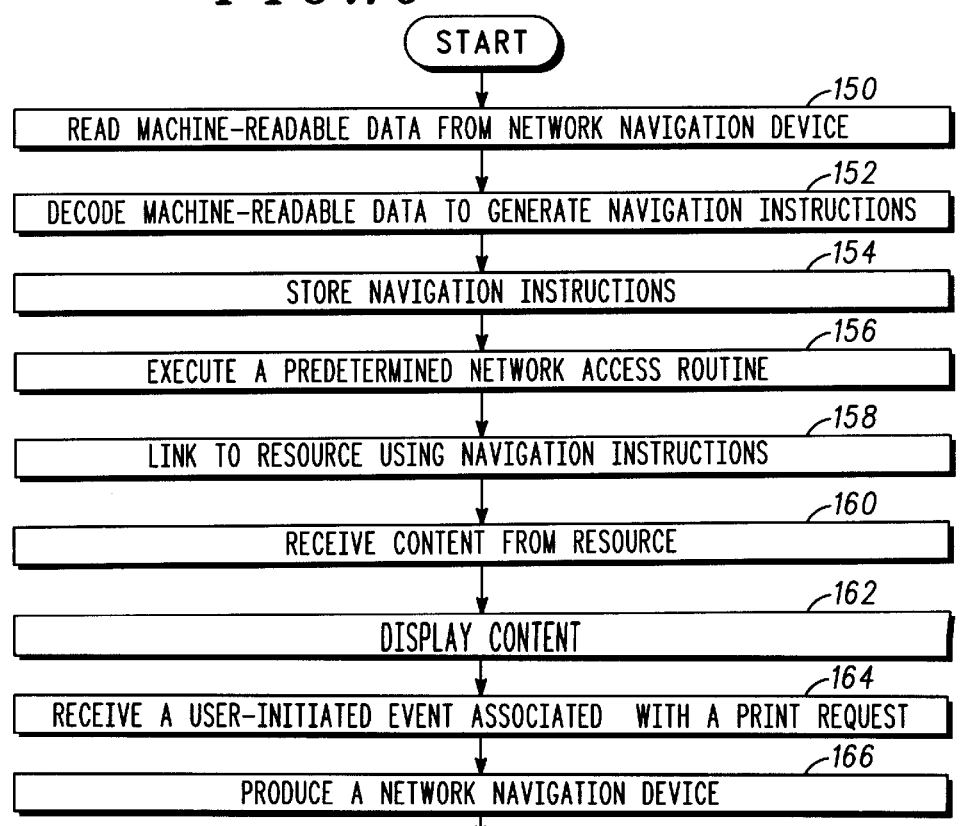
FIG. 11 is a flow chart of an embodiment of a method of linking to a resource in an electronic network.

FIG. 11 is a flow chart of an embodiment of a method of linking to a resource in an electronic network. The method can be utilized by the network access apparatus 22 in FIG. 1 to automatically link the end user 28 to a resource encoded on the network navigation device 10. Typically, the end user 28 selects a desired resource to visit based upon the first human-viewable image 14 associated therewith on the network navigation device 10.

As indicated by block 150, the method includes a step of reading machine-readable data from a network navigation device. The machine-readable data is read using the data reader 30. The specific type of data reader utilized is selected based upon how the machine-readable data is stored on the network navigation device.

As indicated by block 152, a step of decoding the machine-readable data is performed to generate navigation instructions. The navigation instructions tell the network access apparatus 22 how to link to the resource. As described earlier, the navigation instructions can include at least a portion of a URL or at least a portion of an IP address for the resource. If a partial address is received, an additional step of completing the electronic address can be performed. For example, if an IP address is received, the IP address can be prepended by "http://".

Optionally, a step of storing the navigation instructions is performed as indicated by block 154. The navigation instructions can be stored as a bookmark or stored in a favorites list, such as those available in many Web browsers, to provide a shortcut to the electronic address. Thereafter, a user can link to the resource by selecting the shortcut rather than having to re-read the navigation instructions from the network navigation device.

Preferably, a representation of the first human-viewable image 14 is stored to provide an iconic representation for the shortcut to the resource. As a result, the association between the first human-viewable image 14 and the resource is reinforced. Similarly, a representation of the second human-viewable image 18 can be stored for display with the iconic representation. This further reinforces the association between the second human-viewable image 18 and a service which provides the resource.

To facilitate storing a representation of the human-viewable images 14 and 18, the machine-readable data can include machine-readable data representative of the human-viewable images 14 and 18 read in step 150. Alternatively, the human-viewable images 14 and 18 can be optically scanned into the network access apparatus 22 using a page scanner or the like. As another alternative, an electronic representation of the first human-viewable image 14 can be downloaded from the resource, and an electronic representation of the second human-viewable image 18 can be downloaded from the service upon linking thereto.

As indicated by block 156, a step of executing a predetermined network access routine is performed. The step of executing the predetermined network access routine can include any of: (i) executing a routine to connect and/or to logon to a service provider (e.g. executing a dial-up routine or a wireless authentication routine to connect to a service provider); and (ii) executing a client routine for subsequent user interaction with the electronic address (e.g. executing a graphical user interface routine or a Web browsing routine).

The step of executing the predetermined network access routine can be executed prior to reading the machine-readable data in block 150. Alternatively, the predetermined network access routine can be automatically initiated upon reading the machine-readable data in block 110. Here, the machine-readable data 16 can include instructions for directing the initiation of the predetermined network access routine, and for directing which predetermined network access routine is to be executed.

In particular, the machine-readable data 16 can include instructions for directing the type and the specifics of the connection to be made to the electronic network 20. These instructions can dictate whether a wireline connection or a wireless connection should be made, and/or which wireline connection or which wireless connection should be made. As a result, the instructions on one network navigation device may direct a connection to a first service provider (e.g. America Online) while the instructions on another network navigation device direct a connection to a second service provider (e.g. CompuServe).

Further, the machine-readable data 16 can include instructions for selecting which client routine is to be executed. As a result, the instructions on one network navigation device may direct that a first graphical user interface routine (e.g. Netscape Navigator) be executed, while the instructions on another network navigation device direct a that second graphical user interface routine (e.g. Microsoft Internet Explorer) be executed.

As indicated by block 158, the method includes a step of linking to the resource using the navigation instructions. This step typically includes transmitting the navigation instructions to the electronic network 20 to establish the link to the resource.

As indicated by block 160, the method includes a step of receiving content from the resource once the link is established. The content from the resource can include audible information and/or visual information, such as graphical information and/or textual information. Examples of the content include, but are not limited to, any combination of a file from a local hard drive, a file from a FTP server, an HTML document, content from a Gopher server, a message from a newsgroup, a transmission from a Telnet session, a transmission from a WAIS server, an animation file, a movie file, an audio file, downloadable software, and an electronic book file.

The content can also have the form of a videotelephone call with an individual. Here, for example, the first human-viewable image 14 can include a picture and/or a name of the individual, and the machine-readable data can include a telecommunication number or an electronic address for communicating with the individual.

As indicated by block 162, the method includes a step of displaying the content from the resource. The content can be displayed on the display device 32 or the hard copy device 38. As described earlier, the content can include an image which corresponds to at least a portion of the first human-viewable image 14 on the network navigation device 10. Additionally, the content can include an image which corresponds to at least a portion of the second human-viewable image 18.

As indicated by block 164, the method optionally includes a step of receiving a user-initiated event associated with a print request. The user-initiated event can include, for example, a step of receiving a print command issued by the end user 28 within the client routine.

As indicated by block 166, the method optionally includes a step of producing another network navigation device in response to receiving the user-initiated event. In general, this network navigation device is produced in accordance with any of the embodiments of the method described with reference to FIG. 2. Of particular interest, however, is the case in which machine-readable data for linking to the resource and any human-viewable images are printed onto a substrate using a hard copy device. Here, in an exemplary embodiment, the content of the resource is printed to one or more pages of printing material, such as paper, cardboard, or plastic. The machine-readable data is printed to at least one of the one or more pages, and preferably, to each of the one or more pages.

An article of manufacture can be formed to direct a network access apparatus to perform the above-described steps. The article of manufacture can include a computer-readable storage medium having computer-readable data stored therein which directs the network access apparatus to perform the above-described steps. Examples of the computer-readable storage medium include, but are not limited to, a logic circuit, a memory, a mass storage medium, an optical disk, a CD-ROM, a magnetic disk, a floppy disk, a hard disk, and a PCMCIA card.

Figure 12:
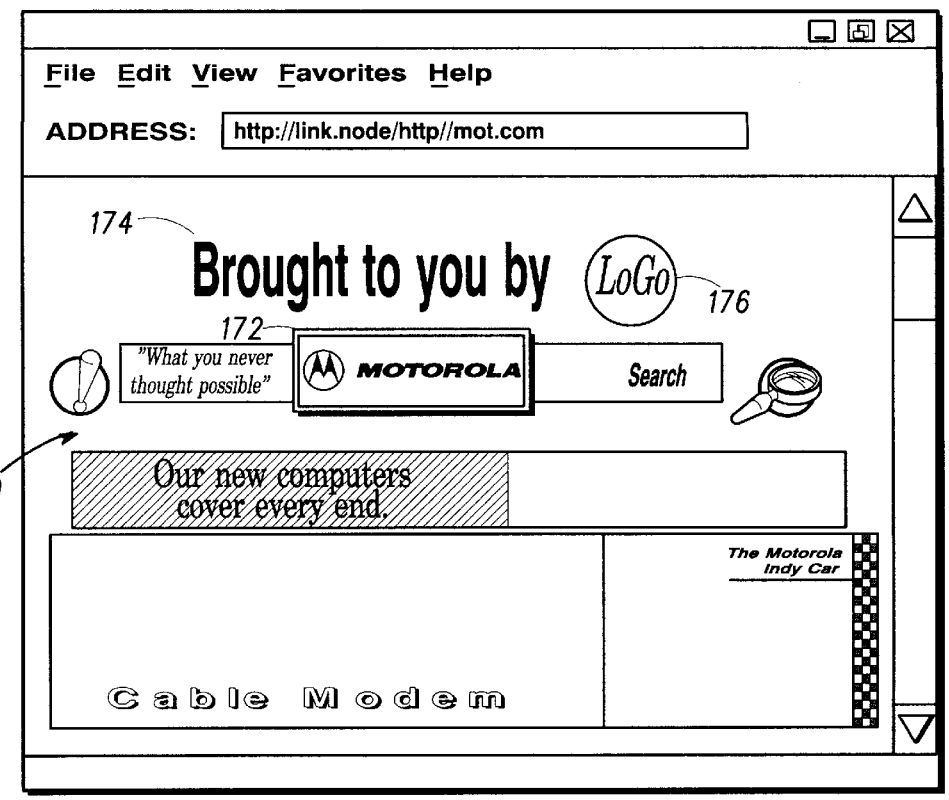
FIG. 12 illustrates an example display of content of a resource using the network navigation device of FIG. 3.

FIG. 12 illustrates an example display of content of a resource using the network navigation device of FIG. 3. The display includes content 170 from the resource, which includes an image 172 corresponding to the first human-viewable image 42. The display further includes content 174 added by the linking service. The content 174 includes an image 176 corresponding to the second human-viewable image 44.

Figure 13:
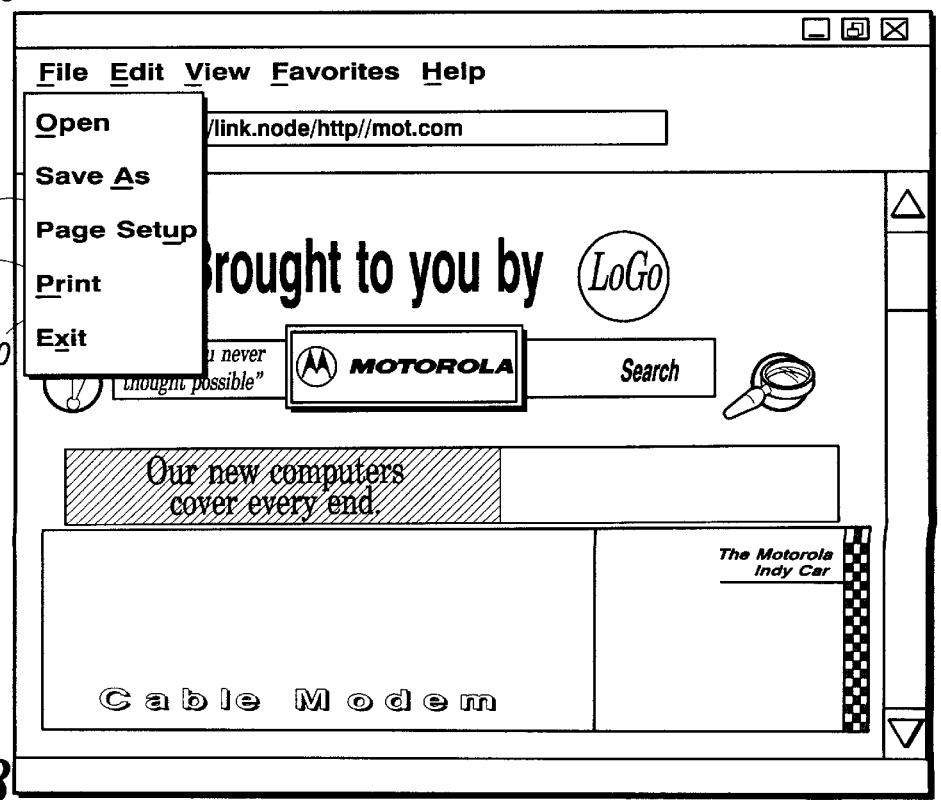
FIG. 13 illustrates an example of a step of receiving a user-initiated event associated with a print request.

FIG. 13 illustrates an example of a step of receiving a user-initiated event associated with a print request. This example continues with the example display of FIG. 12. The user-initiated event includes pointing a cursor 180 to a print hot spot 182 on the display, and clicking on the print hot spot 182. It is noted that the print hot spot 182 can be located at an icon indicative of the print command rather than within a pull-down menu 184 as illustrated. Alternatively, the print command can be issued by a user-initiated event received via a keyboard. Here, for example, the print command can be issued by the end user depressing "ALT-p" using the keyboard.

Figure 14:
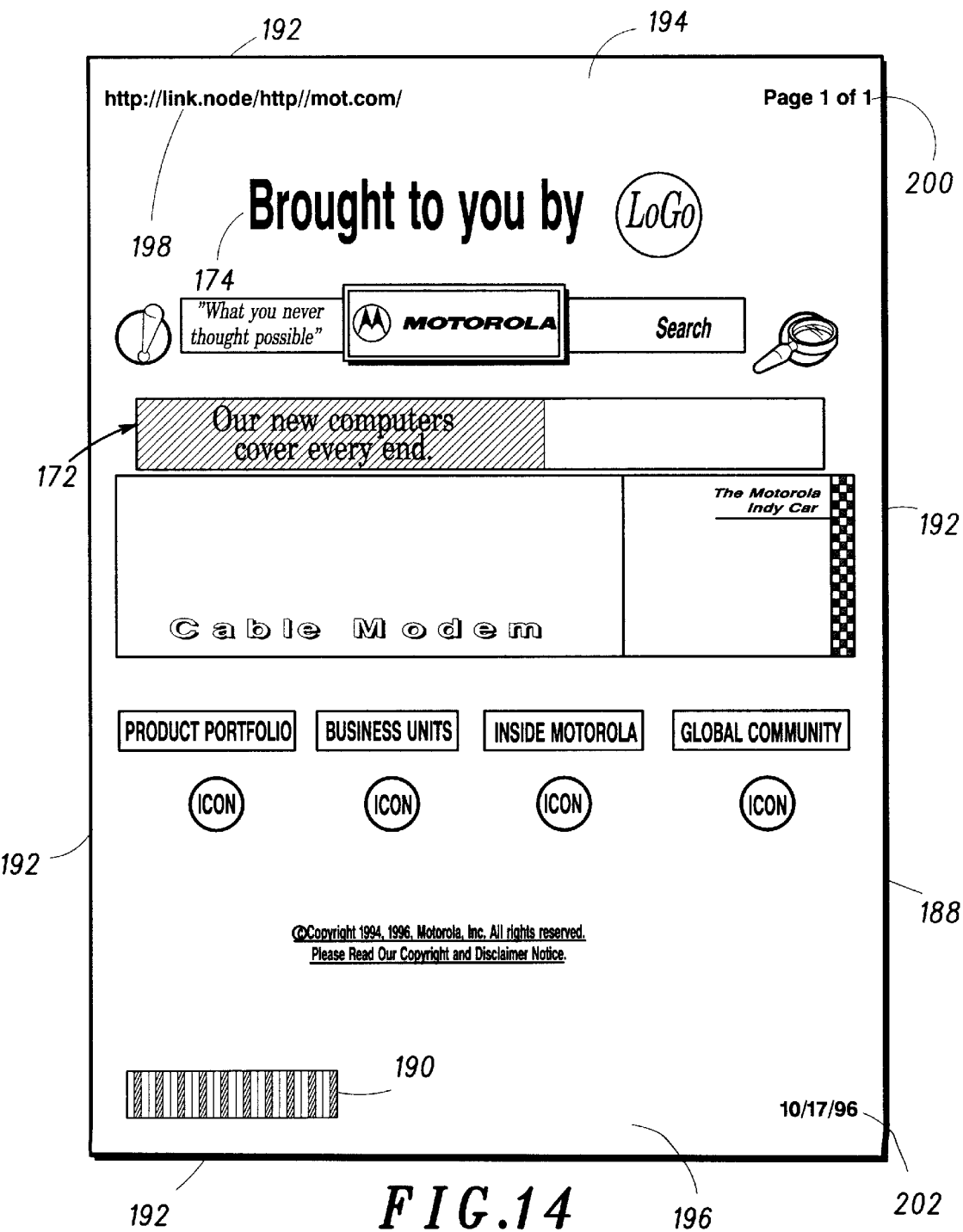
FIG. 14 illustrates an example of a hard copy output produced in response to receiving a print command.

FIG. 14 illustrates an example of a hard copy output produced in response to receiving the print command. The hard copy output is produced on a sheet 188 of material, such as paper, cardboard, or plastic, using the hard copy device 38.

The hard copy output includes the content 170 from the resource and optionally the content 174 added by the linking service. The hard copy output further includes machine-readable data 190 for linking to the resource. The machine-readable data 190 allows the end user or another user to quickly re-link to the resource using the hard copy output.

The machine-readable data 190 has the form of printed data, such as a one-dimensional or a two-dimensional bar code. Although the machine-readable data 190 can be located anywhere on the sheet 188, it is preferred that the machine-readable data 190 be printed near any peripheral edge 192 of the sheet 188. More preferably, the machine-readable data 190 is printed in either a header 194 or a footer 196 of the sheet 188. In the embodiment illustrated in FIG.

13, the machine-readable data 190 is printed on a left side of the footer 196.

Additional information can also be printed in the header 194 and the footer 196 of the sheet 188. The additional information can include a human-viewable form 198 of the electronic address, a page number 200 for the sheet 188, a date 202 and a time (not illustrated) at which the resource was visited or the hard copy output was printed.

It is noted that, in this example, the resource can be initially visited by the end user 28 with or without the use of a network navigation device in accordance with the present invention.

Figure 15:
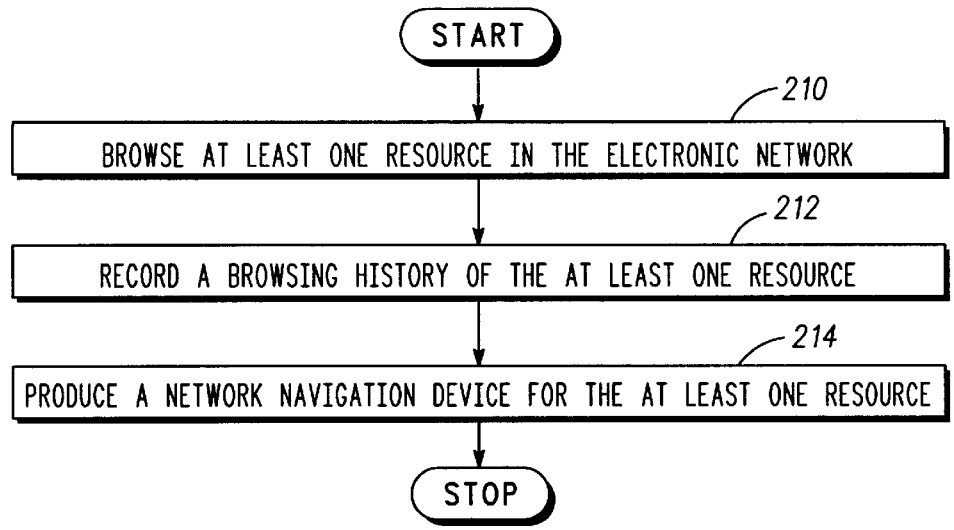
FIG. 15 is a flow chart of an embodiment of a method of producing a network navigation device based on a browsing history of the end user.

FIG. 15 is a flow chart of an embodiment of a method of producing a network navigation device based on a browsing history of the end user 28. As indicated by block 210, the method includes a step of browsing at least one resource in the electronic network 20. The at least one resource can be browsed by the end user 28 with or without the use of a network navigation device in accordance with the present invention. Typically, the at least one resource includes a plurality of resources.

As indicated by block 212, the method includes a step of recording a browsing history of the at least one resource in the electronic network 20. The step of recording the browsing history can include any of: recording an electronic address for each of the at least one resource, recording a respective image included in the content of each resource, recording a sequence in which the at least one resource was browsed, and recording a hierarchy of the at least one resource in the electronic network 20. The browsing history can be recorded in a storage device associated with either the network access apparatus 22 or the electronic network 20.

As indicated by block 214, the method includes a step of producing a network navigation device for the at least one resource. The step of producing the network navigation device can be performed using any embodiment of the method described with reference to FIG. 2.

The network navigation device is produced using the respective image and a machine-readable form of the electronic address for each of the at least one resource in the browsing history. The images and the machine-readable data produced thereby can be formatted in accordance with the sequence in which the at least one resource was browsed, or in accordance with the hierarchy of the at least one resource in the electronic network.

Figure 16:
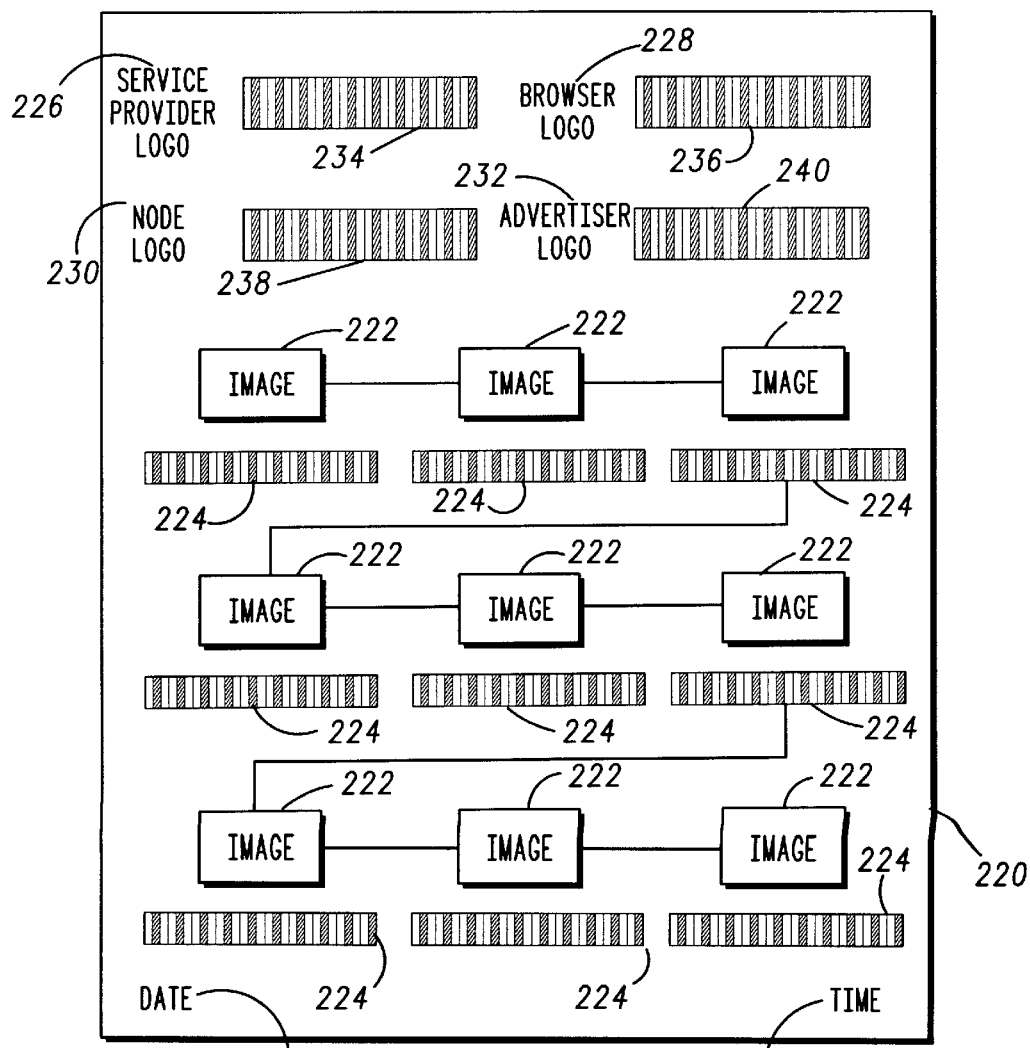
FIG. 16 is an illustration of a first embodiment of a network navigation device for a plurality of resources.

FIG. 16 is an illustration of a first embodiment of a network navigation device for a plurality of resources. The network navigation device is produced on a sheet 220 of material, such as paper, plastic, or cardboard, using a hard copy device.

For each of the plurality of resources, the network navigation device includes a human-viewable image 222 and machine-readable data 224. Each human-viewable image 222 indicates its respective resource to the end user 28, while each machine-readable data 224 provides an instruction to link to the resource. Each machine-readable data 224 has the form of printed data, such as a one-dimensional or a two-dimensional bar code. The human-viewable image 222 and the machine-readable data 224 for the plurality of resources may be arranged sequentially in accordance with a sequence in which the plurality of resources was visited.

Optionally, the network navigation device includes: (i) a human-viewable image 226 associated with a service provider; (ii) a human-viewable image 228 associated with a client routine; (iii) a human-viewable image 230 associated with a node in the electronic network; and (iv) a human-viewable image 232 associated with an advertiser. As illustrated, each of the human-viewable images 226, 228, 230, and 232 can include a respective logo or the like. The service provider, the client routine, and the node can be those utilized to browse the plurality of resources, or can be others which may be utilized in a subsequent browsing session.

Proximate to the human-viewable image 226 is machine-readable data 234 associated with the service provider. The machine-readable data 234 can provide instructions to connect and/or to logon to the service provider. Alternatively, the machine-readable data 234 can provide an instruction for linking to a resource which provides information regarding the service provider.

Proximate to the human-viewable image 228 is machine-readable data 236 associated with the client routine. The machine-readable data 236 can provide instructions for executing the client routine, for downloading the client routine from the electronic network 20, of for obtaining information about the client routine from the electronic network 20.

Proximate to the human-viewable image 230 is machine-readable data 238 associated with the node in the electronic network. The machine-readable data 238 can provide instructions for linking to the node, for example.

Proximate to the human-viewable image 232 is machine-readable data 240 associated with the advertiser. The machine-readable data can provide instructions for linking to a resource associated with the advertiser.

Preferably, each item of the machine-readable data 234, 236, 238, and 240 has the form of printed data, such as a one-dimensional or a two-dimensional bar code.

Additional information can also be printed on the sheet 220, such as a date 242 and a time 244 at which the plurality of resources was visited or the network navigation device was produced.

Figure 17:
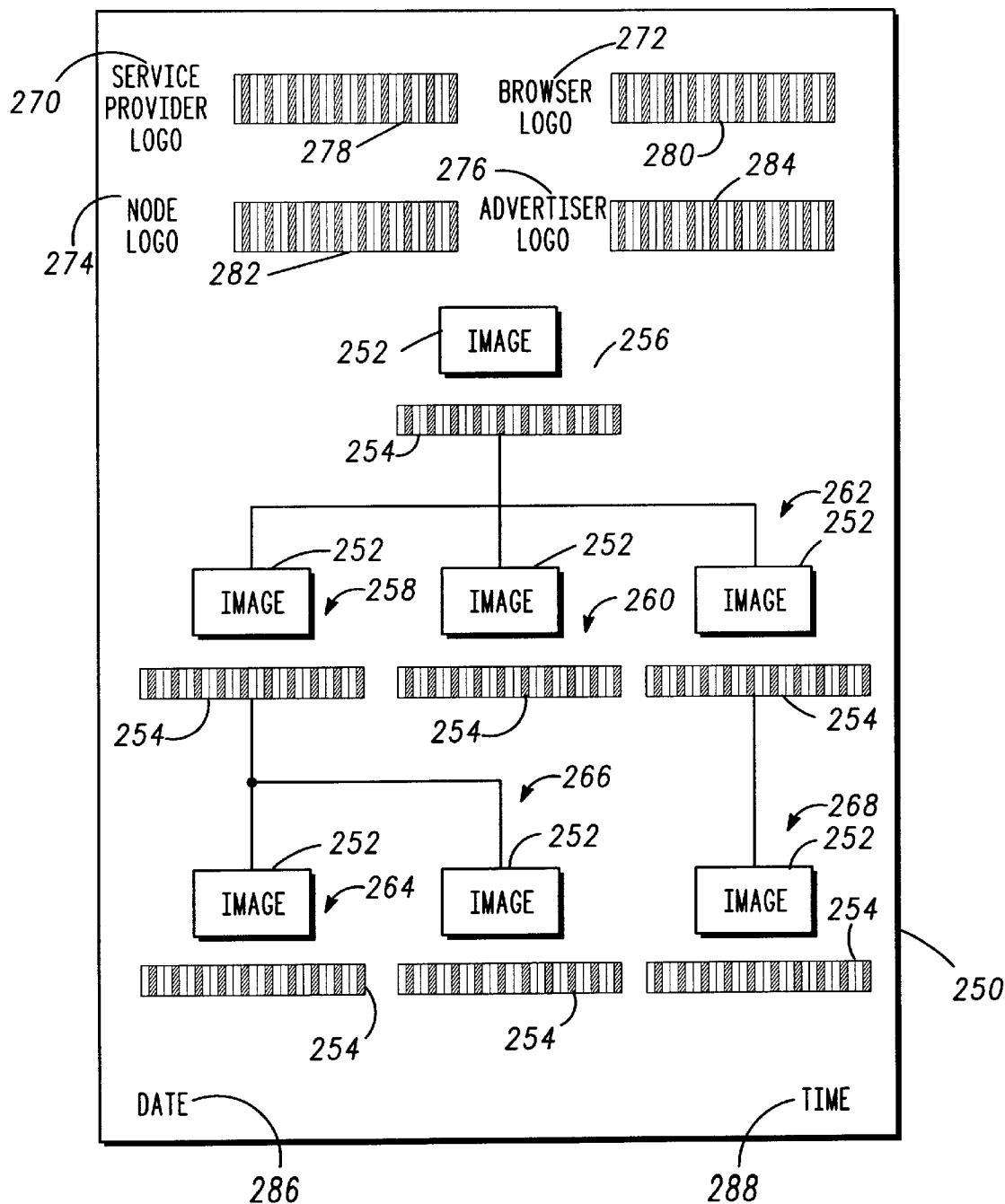
FIG. 17 is an illustration of a second embodiment of a network navigation device for a plurality of resources.

FIG. 17 is an illustration of a second embodiment of a network navigation device for a plurality of resources. The network navigation device is produced on a sheet 250 of material, such as paper, plastic, or cardboard, using a hard copy device.

For each of the plurality of resources, the network navigation device includes a human-viewable image 252 and machine-readable data 254, such as the human-viewable image 222 and the machine-readable data 224 described with reference to FIG. 16. The human-viewable image 252 and the machine-readable data 254 for the plurality of resources are arranged hierarchically in accordance with the hierarchy of the plurality of resources in the electronic network 20. For example, a resource represented by reference numeral 256 can be a home page having hyperlinks to resources represented by reference numerals 258, 260, and 262. The resource represented by reference numeral 258 has hyperlinks to resources represented by reference numerals 264 and 266. The resource represented by reference numeral 262 has a hyperlink to a resource indicated by reference numeral 268.

The network navigation device optionally includes human-viewable images 270, 272, 274, and 276, such as the human-viewable images 226, 228, 230, and 232 described with reference to FIG. 16. Further, the network navigation device can optionally include machine-readable data 278, 280, 282, and 284, such as the machine-readable data 234, 236, 238, and 240 described with reference to FIG. 16. Still further, the network navigation device can include additional information such as a date 286 and a time 288 at which the plurality of resources was visited or the network navigation device was produced.

Figure 18:
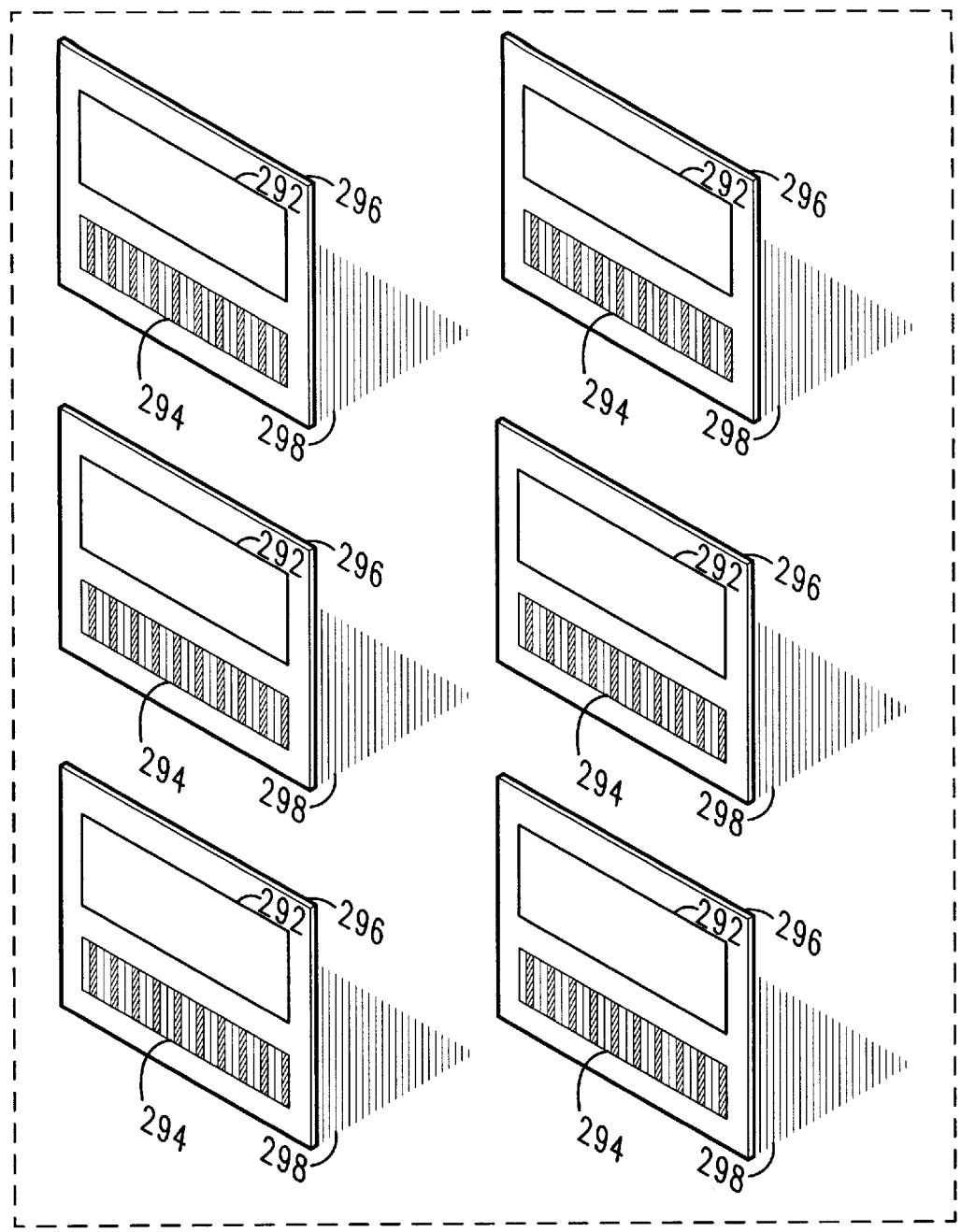
FIG. 18 is an illustration of a third embodiment of a network navigation device for a plurality of resources.

FIG. 18 is an illustration of a third embodiment of a network navigation device for a plurality of resources. The network navigation device is produced on a sheet 290 of material, such as paper, plastic, or cardboard, using a hard copy device.

For each of the plurality of resources, the network navigation device includes a human-viewable image 292 and machine-readable data 294, such as the human-viewable image 222 and the machine-readable data 224 described with reference to FIG. 16. The human-viewable image 292 and the machine-readable data 294 for the plurality of resources are printed to appear in perspective views. For example, each human-viewable image 292 and machine-readable data 294 can appear within a perspective view of a respective card 296. To provide a sense of depth, a respective shadow 298 can be printed for each respective card 296.

Figure 19:
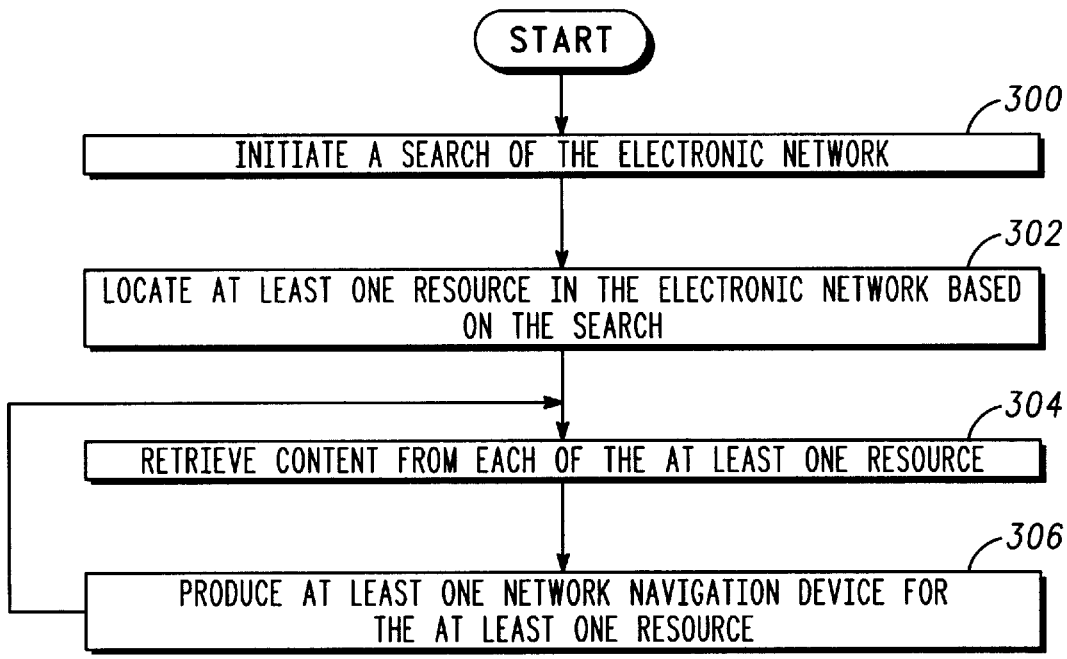
FIG. 19 is a flow chart of an embodiment of a method of producing a network navigation device.

FIG. 19 is a flow chart of an embodiment of a method of producing a network navigation device. The method can be initiated either at the premises of the end user 28 or at a node in the electronic network 20.

As indicated by block 300, the method includes a step of initiating a search of the electronic network 20. The step of initiating the search is performed to locate resources in the electronic network 20. The search can be initiated by a human, such as the end user 28, or can be autonomously initiated by either the network access apparatus 22 or a node in the electronic network 20 (such as the node 24). The resources to be located can be known or unknown to the initiator of the search at the time of initiating the search. The search can be performed using any of the following: (i) a search engine; (ii) a software agent; (iii) a software robot; (iv) a network worm; (v) a network spider; or (vi) a network crawler.

As indicated by block 302, the method includes a step of locating at least one resource in the electronic network 28 as a result of the search. Each of the at least one resource can be identified by an electronic address therefor. Typically, the step of locating at least one resource results in locating a plurality of resources in the electronic network 28.

As indicated by block 304, the method includes a step of retrieving content from each of the at least one resource. Preferably, the content from each of the at least one resource includes a human-viewable image indicative of the resource.

As indicated by block 306, the method includes a step of producing at least one network navigation device for the at least one resource. The at least one network navigation device is produced in accordance with any embodiment of the method described with reference to FIG. 2. Each network navigation device is produced using a machine-readable form of the electronic address for a respective resource, and the human-viewable image included in the content of the respective resource. In general, each network navigation device can be associated with a single resource (as in the examples of FIGS. 3 to 9 and FIG. 14) or with a plurality of resources (as in the examples of FIGS. 16 to 18).

To track changes in the content of the at least one resource, flow of the method is directed back to block 304. The at least one resource is retrieved to determine if any changes have occurred in the content or in the electronic address. If so, then subsequent network navigation devices produced in block 306 utilize a modified human-viewable image and/or modified machine-readable data for the resource.

Figure 20:
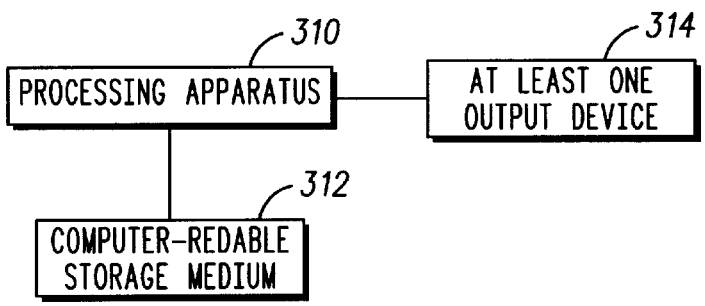
FIG. 20 is a block diagram of an embodiment of a system for producing a network navigation device.

FIG. 20 is a block diagram of an embodiment of a system for producing a network navigation device. The system includes a processing apparatus 310, a computer-readable storage medium 312, and at least one output device 314. The computer-readable storage medium 312 stores computer-readable data to direct the processing apparatus 310 to produce the network navigation device. The computer-readable data is utilized by the processing apparatus 310 to direct the at least one output device 314 to write machine-readable data to a substrate and to write a first human-viewable image to the substrate. The machine-readable data provides an instruction for linking to a resource in an electronic network, and the first human-viewable image provides an association with the resource. The above-described system can be further utilized to perform any additional steps described herein for producing the network navigation device.

Examples of the processing apparatus 310 include, but are not limited to: (i) embodiments of the network access apparatus 22 described herein; (ii) a general purpose computer; and (iii) a server on a node in the electronic network. The processing apparatus 310 can be located proximate to the end user 28 or the node in the electronic network 20.

Examples of the computer-readable storage medium 312 include, but are not limited to, a logic circuit, a memory, a mass storage medium, an optical disk, a CD-ROM, a magnetic disk, a floppy disk, a hard disk, and a PCMCIA card. The computer-readable storage medium 312 can be located at the premises of the end user 28, at the premises of the node in the electronic network 20, or elsewhere. If located at the node, the computer-readable data stored by the computer-readable storage medium 312 can be downloaded to end users via the electronic network 20.

Further, the computer-readable storage medium 312 can include computer-readable data which provides additional software, such as a client program, a browser program, a word processing program, or a desktop publishing program, for initiating or assisting in the production of the network navigation device.

Examples of the at least one output device 314 include any combination of one or more of: (i) a hard copy output device, such as any of the examples of the hard copy device 38 described herein; (ii) magnetic data writer, such as a magnetic stripe writer; (iii) an RF tag writer; and (iv) a memory writer, such as a PCMCIA card writer. The at least one output device 314 can be located at the premises of the end user 28, at the premises of the node in the electronic network 20, or elsewhere.

In general, the above-described system can be utilized to produce a network navigation device, or by a service at the node to produce network navigation devices. If located at different premises, the processing apparatus 310, the computer-readable storage medium 312, and the at least one output device 314 can communicate via the electronic network 20 to produce the network navigation device.

Figure 21:
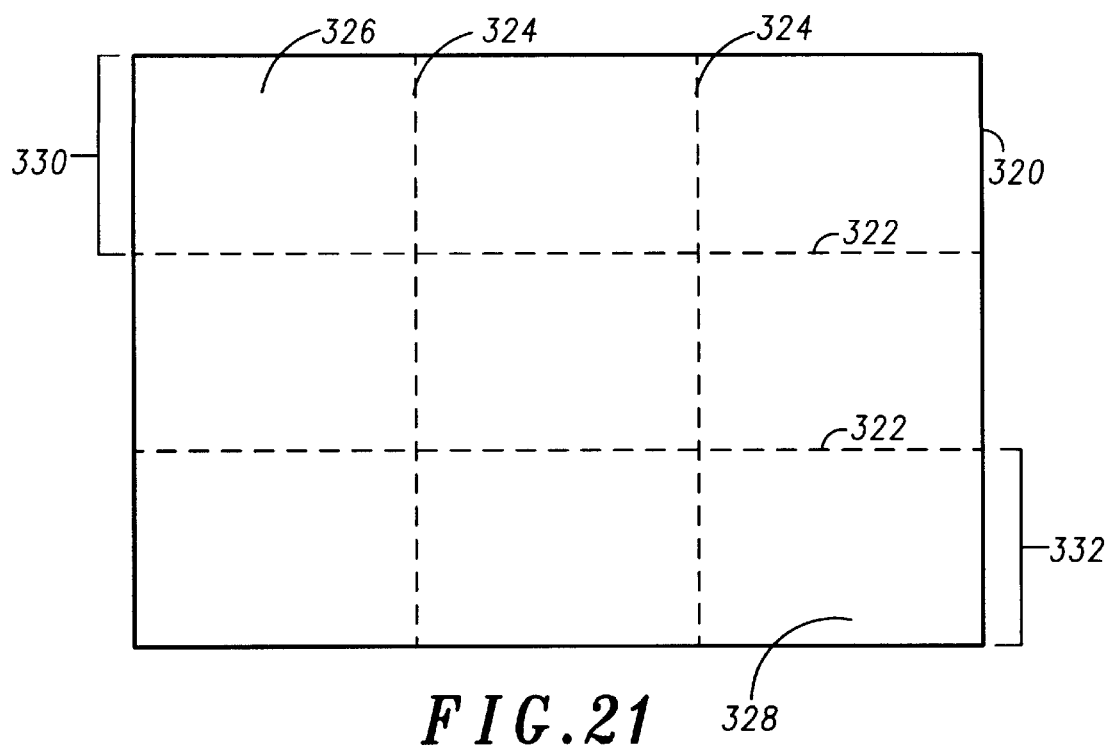
FIG. 21 illustrates an embodiment of a substrate for use in forming a network navigation device.

FIG. 21 illustrates an embodiment of a substrate for use in forming a network navigation device. The substrate includes a sheet of material 320. The sheet of material 320 can be formed of paper, plastic, cardboard, or other printing material. The sheet of material 320 can be sized in accordance with a standard size of printing material, or can have a custom size.

The substrate includes a first plurality of concertina folds 322 and a second plurality of concertina folds 324. The first plurality of concertina folds 322 is oriented transverse to, and preferably perpendicular to, the second plurality of concertina folds 324. It is also preferred that the first plurality of concertina folds 322 consists of an even number of folds, and that the second plurality of concertina folds 324 consists of an even number of folds. In an exemplary embodiment, the first plurality of concertina folds 322 consists of two folds and the second plurality of concertina folds 324 consists of two folds.

The first and second plurality of concertina folds 322 and 324 divide the sheet of material 320 into a plurality of segments. The plurality of segments includes a first corner segment 326 and a second corner segment 328. The first corner segment 326 is diagonally opposite to the second corner segment 328.

A first tab 330 is disposed at the first corner segment 326 and a second tab 332 is disposed at the second corner segment 328. The first tab 330 and the second tab 332 may be grasped by a user to fold or to unfold the substrate.

Typically, the first tab 330 and the second tab 332 are smaller than the first corner segment 326 and the second corner segment 328. The first tab 330 and the second tab 332 can be formed of the same material as the sheet of material 320, or can be formed using a different material. Further, the first tab 330 and the second tab 332 can have the same thickness and/or the same stiffness as the sheet of material 320. The first tab 330 and the second tab 332 can be integrated into the form of the sheet of material 320, or can be attached to the sheet of material 320 after the sheet of material 320 has been formed.

Figure 22:
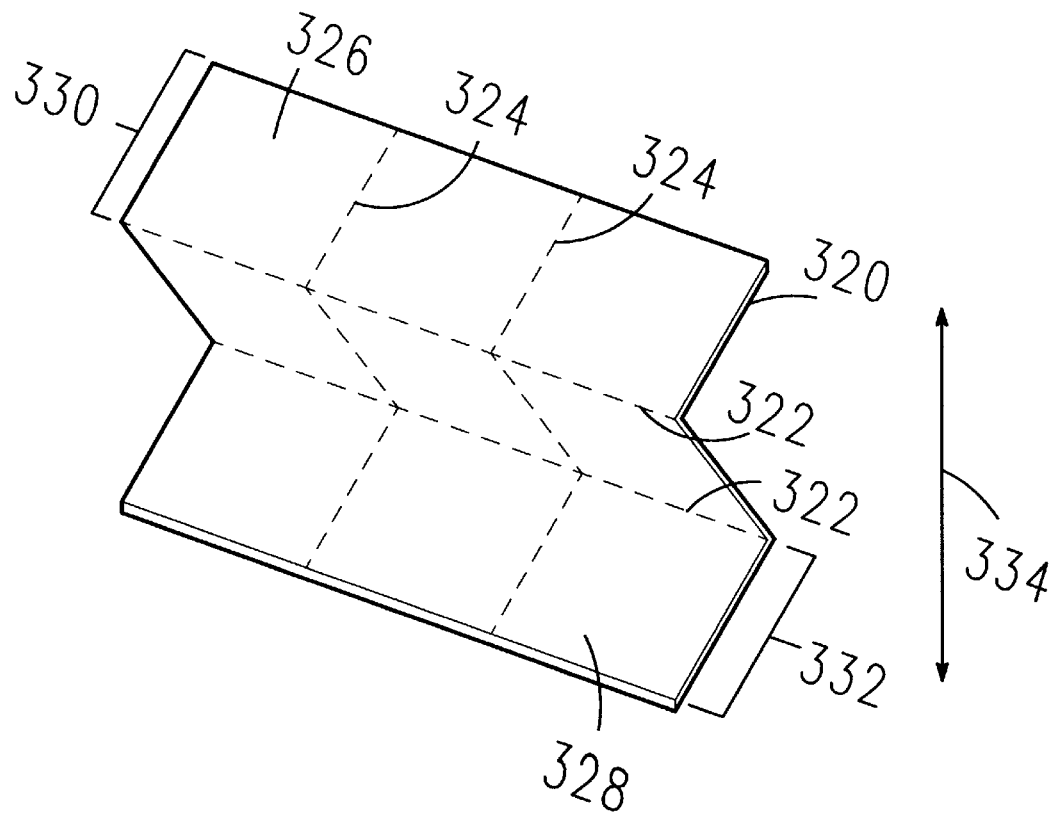
FIG. 22 is an illustration of the substrate of FIG. 21 in a first partially-folded state.

FIG. 22 is an illustration of the substrate of FIG. 21 in a first partially-folded state. The first partially-folded state is attained as the user begins to move at least one of the first tab 330 and the second tab 332 substantially parallel to a first axis 334. The first axis 334 is transverse to, and preferably perpendicular to, the orientation of the first plurality of concertina folds 322. As illustrated, the substrate folds along the first plurality of concertina folds 322 in the first partially-folded state.

Figure 23:
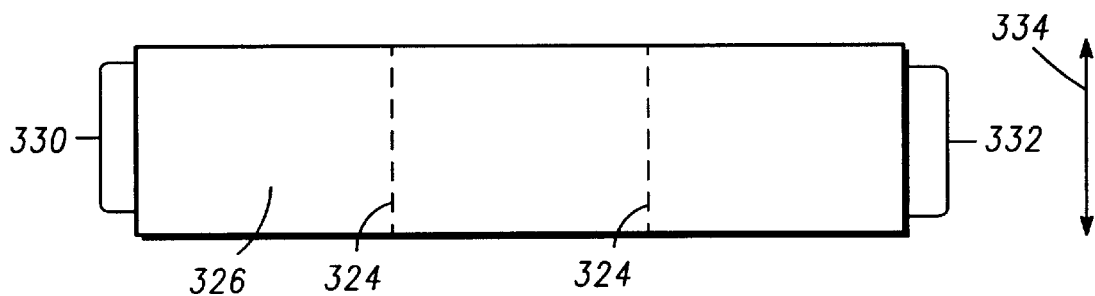
FIG. 23 is an illustration of the substrate of FIG. 21 in a second partially-folded state.

FIG. 23 is an illustration of the substrate of FIG. 21 in a second partially-folded state. The second partially-folded state is attained as the user continues to move at least one of the first tab 330 and the second tab 332 along a path substantially parallel to the first axis 334. As illustrated, the substrate is completely folded along the first plurality of concertina folds 322 in the second partially-folded state.

Figure 24:
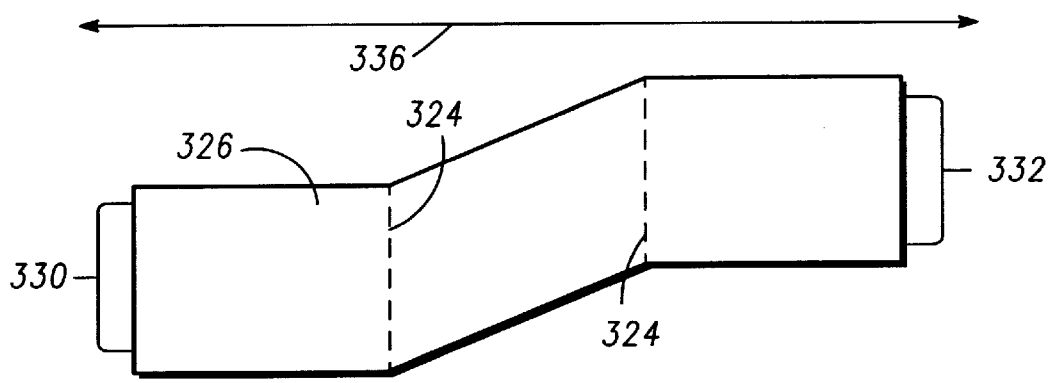
FIG. 24 is an illustration of the substrate of FIG. 21 in a third partially-folded state.

FIG. 24 is an illustration of the substrate of FIG. 21 in a third partially-folded state. The third partially-folded state is attained as the user begins to move at least one of the first tab 330 and the second tab 332 substantially parallel to a second axis 336. The second axis 336 is transverse to, and preferably perpendicular to, the second plurality of concertina folds 324. As illustrated, the substrate folds along the second plurality of concertina folds 324 in the third partially-folded state.

Figure 25:
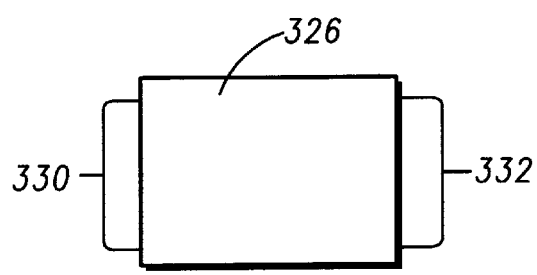
FIG. 25 is an illustration of the substrate of FIG. 21 in a completely-folded state.

FIG. 25 is an illustration of the substrate of FIG. 21 in a completely-folded state. The completely-folded state is attained as the user continues to move at least one of the first tab 330 and the second tab 332 along a path parallel to the second axis 336. As illustrated, the substrate is completely folded along the second plurality of concertina folds 324, as well as along the first plurality of concertina folds 322, in the completely-folded state.

The user can unfold the substrate by reversing the process described with reference to FIGS. 21 to 25. Specifically, the substrate is unfolded by, firstly, moving at least one of the first tab 330 and the second tab 332 apart along the second axis 336, and secondly, moving at least one of the first tab 330 and the second tab 332 apart along the first axis 334.

Embodiments of the above-described substrate can support any combination of the human-viewable images and machine-readable data described herein to provide a network navigation device. Further, the substrate can support supplementary information, such as human-readable information describing how to use the network navigation device and/or human-readable information describing the resources which can be accessed using the network navigation device. Also, the substrate can provide space for printing a summary of a navigation session using the hard copy device 38 in FIG. 1.

Thus, there has been described several embodiments, including preferred embodiments, of a method, system, and article of manufacture for producing a network navigation device.

Because the various embodiments of the present invention generate a device having a human-viewable image which is associated with a resource at an electronic address and having machine-readable data for linking to the electronic address, they provide a significant improvement in that the addressing format and the address itself become more transparent to the end user.

Consequently, the problem of address complexity using embodiments of the network navigation device and the importance of reserving desired domain names is reduced.

Additionally, the various embodiments of the present invention as herein-described provide methods and systems for an end user to produce a network navigation device. The methods can be utilized by the end user within a document browser software program, a word processor program, or a desktop publishing program, for example, to produce the network navigation device.

Further, the various embodiments of the present invention provide methods and systems for an automated service to produce network navigation devices.

It will be apparent to those skilled in the art that the disclosed invention may be modified in numerous ways and may assume many embodiments other than the preferred forms specifically set out and described above.

Accordingly, it is intended by the appended claims to cover all modifications of the invention which fall within the true spirit and scope of the invention.

What is claimed is:

1. A method of producing a network navigation device, the method comprising the steps of:

linking to a first resource in an electronic network;

receiving content of the first resource via the electronic network;

displaying at least a portion of the content using a browser;

receiving a print command within the browser after said displaying;

printing first machine-readable data to a substrate in response to the print command, the first machine-readable data providing at least one instruction for linking to the first resource, wherein the first machine-readable data is absent from the content of the first resource; and printing at least a portion of the content to the substrate in response to the print command.

2. The method of claim 1 further comprising the steps of:

recording a browsing history of a plurality of resources in the electronic network, wherein the plurality of resources include the first resource and a second resource;

printing second machine-readable data to the substrate in response to the print command, the second machine-readable data providing at least one instruction for linking to the second resource; and printing content of the second resource to the substrate in response to the print command.

3. The method of claim 1 further comprising the steps of:
initiating a search of the electronic network; and
locating at least one resource in the electronic network;
wherein the at least one resource includes the resource for which the machine-readable data and the first human-viewable image are written.

4. The method of claim 2 wherein the plurality of resources in the browsing history further includes a third resource, the method further comprising the steps of:

printing third machine-readable data to the substrate in response to the print command, the third machine-readable data providing at least one instruction for linking to the third resource; and printing content of the third resource to the substrate in response to the print command;

wherein the first machine-readable data, the second machine-readable data, and the third machine-readable data are arranged on the substrate in accordance with a sequence of browsing the first resource, the second resource, and the third resource in the browsing history.

5. The method of claim 2 wherein the plurality of resources in the browsing history further includes a third resource, the method further comprising the steps of:

writing third machine-readable data to the substrate in response to the print command, the third machine-readable data providing at least one instruction for linking to the third resource; and printing content of the third resource to the substrate in response to the print command;

wherein the first machine-readable data, the second machine-readable data, and the third machine-readable data are arranged on the substrate in accordance with a hierarchy of the first resource, the second resource, and the third resource in the electronic network.

6. The method of claim 1 wherein the first machine-readable data includes an electronic address for the first resource.

7. The method of claim 1 wherein the first machine-readable data includes at least a portion of a uniform resource locator for the first resource.

8. The method of claim 1 wherein the first machine-readable data includes at least a portion of an internet protocol address for the first resource.

9. The method of claim 1 wherein the first machine-readable data is not readily interpretable by a user.

10. The method of claim 1 wherein the first machine-readable data includes a bar code.

11. The method of claim 1 wherein the first machine-readable data includes an instruction for directing an initiation of a network access routine.

12. The method of claim 1 wherein the first machine-readable data includes an instruction for directing a connection to a service provider to access the electronic network.

13. The method of claim 12 further comprising the step of writing a second human-viewable image to the substrate, the second human-viewable image associated with the service provider.

14. The method of claim 1 wherein the first machine-readable data includes an instruction for selecting a client routine to be executed.

15. The method of claim 14 further comprising the step of writing a second human-viewable image to the substrate, the second human-viewable image associated with the client routine.

16. The method of claim 1 further comprising the step of writing a second human-viewable image to the substrate, the second human-viewable image associated with an advertiser.

17. The method of claim 16 further comprising the step of writing second machine-readable data to the substrate, the second machine-readable data providing an instruction for linking to a second resource provided by the advertiser.

18. The method of claim 1 wherein the substrate is formed substantially of a material selected from the group consisting of a dielectric material, a nonmagnetic material, paper, cardboard, and plastic.

19. The method of claim 1 wherein the substrate includes a sheet of printing material.

20. A system for producing a network navigation device, the system comprising:

a processing apparatus to execute a browser program to link to a first resource of an electronic network, to receive content of the first resource via the electronic network, and to display at least a portion of the content, the processing apparatus responsive to a print command in the browser program to direct at least one output device to print first machine-readable data and at least a portion of the content to a substrate, wherein the first machine-readable data provides at least one instruction for linking to the first resource in the electronic network, and wherein the first machine-readable data is absent from the content.

21. An article of manufacture for producing a network navigation device, the article of manufacture comprising:

a computer-readable storage medium; and
computer-readable data stored by the computer-readable storage medium, the computer-readable data utilized by a processing apparatus to provide a browser for linking to a first resource in an electronic network, receiving content of the first resource via the electronic network, and displaying at least a portion of the content, the browser providing a print command to direct at least one output device to print first machine-readable data and at least a portion of the content to a substrate, the first machine-readable data providing at least one instruction for linking to the first resource, wherein the first machine-readable data is absent from the content.

22. The system of claim 20 wherein the browser program is to record a browsing history of a plurality of resources in the electronic network, wherein the plurality of resources include the first resource and a second resource, wherein the print command further directs the at least one output device to print second machine-readable data and content of the second resource to the substrate, the second machine-readable data providing at least one instruction for linking to the second resource.

23. The system of claim 22 wherein the plurality of resources in the browsing history further includes a third resource, wherein the print command further directs the at least one output device to print third machine-readable data and content of the third resource to the substrate, the third machine-readable data providing at least one instruction for linking to the third resource, wherein the first machine-readable data, the second machine-readable data, and the third machine-readable data are arranged on the substrate in accordance with a sequence of browsing the first resource, the second resource, and the third resource in the browsing history.

24. The system of claim 22 wherein the plurality of resources in the browsing history further includes a third resource, wherein the print command further directs the at least one output device to print third machine-readable data and content of the third resource to the substrate, the third machine-readable data providing at least one instruction for linking to the third resource, wherein the first machine-readable data, the second machine-readable data, and the third machine-readable data are arranged on the substrate in accordance with a hierarchy of the first resource, the second resource, and the third resource in the electronic network.

25. The system of claim 20 wherein the first machine-readable data encodes an electronic address of the first resource.

26. The system of claim 20 wherein the first machine-readable data includes a bar code.

27. The article of manufacture of claim 21 wherein the browser program is to record a browsing history of a plurality of resources in the electronic network, wherein the plurality of resources include the first resource and a second resource, wherein the print command further directs the at least one output device to print second machine-readable data and content of the second resource to the substrate, the second machine-readable data providing at least one instruction for linking to the second resource.

28. The article of manufacture of claim 27 wherein the plurality of resources in the browsing history further includes a third resource, wherein the print command further directs the at least one output device to print third machine-readable data and content of the third resource to the substrate, the third machine-readable data providing at least one instruction for linking to the third resource, wherein the first machine-readable data, the second machine-readable data, and the third machine-readable data are arranged on the substrate in accordance with a sequence of browsing the first resource, the second resource, and the third resource in the browsing history.

29. The article of manufacture of claim 27 wherein the plurality of resources in the browsing history further includes a third resource, wherein the print command further directs the at least one output device to print third machine-readable data and content of the third resource to the substrate, the third machine-readable data providing at least one instruction for linking to the third resource, wherein the first machine-readable data, the second machine-readable data, and the third machine-readable data are arranged on the substrate in accordance with a hierarchy of the first resource, the second resource, and the third resource in the electronic network.

30. The article of manufacture of claim 21 wherein the first machine-readable data encodes an electronic address of the first resource.

31. The article of manufacture of claim 21 wherein the first machine-readable data includes a bar code.

* * * * *

UNITED STATES PATENT AND TRADEMARK OFFICE
CERTIFICATE OF CORRECTION

PATENT NO. : 5,986,651 Page 1 of 1
APPLICATION NO. : 08/744338
DATED : November 16, 1999
INVENTOR(S) : Reber et al.

It is certified that error appears in the above-identified patent and that said Letters Patent is hereby corrected as shown below:

ON TITLE PAGE:

Please Insert:

-- Related U.S. Application Data:

(63)  Continuation-in-part of application No. 08/710,820, filed Sep. 23, 1996, now U.S. Pat. No. 5,940,595; application No. 08/726,004, filed Oct. 4, 1996, now U.S. Pat. No. 5,995,105; and application No. 08/732,956, filed Oct. 17, 1996, now U.S. Pat. No. 5,938,726. --

Signed and Sealed this

Twenty-seventh Day of March, 2007

JON W. DUDAS
*Director of the United States Patent and Trademark Office*